US012083060B2

(12) United States Patent
Kauss et al.

(10) Patent No.: US 12,083,060 B2
(45) Date of Patent: Sep. 10, 2024

(54) WHEELCHAIR HARNESS

(71) Applicant: Exo-Seat LLC, Fort Collins, CO (US)

(72) Inventors: Morgan Kauss, Seattle, WA (US); Sonya Alexi Schuppan, Fort Collins, CO (US); Ryan Alexander Weatherbee, Boulder, CO (US); Mohammed Hussam Alsheikh, Dammam (SA); Brandon Lewien, Broomfield, CO (US); Joel Matthew Human, Erie, CO (US); Edward Augustine Herrick-Reynolds, Chevy Chase, MD (US); Guanxiong Fu, Lafayette, CO (US); Adam Alexander Smrekar, Irvine, CA (US)

(73) Assignee: Exo-Seat LLC, Fort Collins, CO (US)

( * ) Notice: Subject to any disclaimer, the term of this patent is extended or adjusted under 35 U.S.C. 154(b) by 0 days.

(21) Appl. No.: 18/301,150

(22) Filed: Apr. 14, 2023

(65) Prior Publication Data

US 2023/0248596 A1 Aug. 10, 2023

Related U.S. Application Data

(63) Continuation of application No. 17/522,816, filed on Nov. 9, 2021, now Pat. No. 11,654,062.

(60) Provisional application No. 63/111,726, filed on Nov. 10, 2020.

(51) Int. Cl.
*A61G 5/14* (2006.01)
*A61G 5/04* (2013.01)

(52) U.S. Cl.
CPC ................ *A61G 5/14* (2013.01); *A61G 5/04* (2013.01)

(58) Field of Classification Search
CPC .................................. A61G 5/14; A61G 5/04
See application file for complete search history.

(56) References Cited

U.S. PATENT DOCUMENTS

| | | | | |
|---|---|---|---|---|
| 4,530,122 | A | 7/1985 | Sanders et al. | |
| 4,948,156 | A | 8/1990 | Fortner | |
| 9,233,036 | B1 * | 1/2016 | Frederick ................ | A61G 5/14 |
| 9,694,717 | B2 | 7/2017 | Hyde et al. | |
| 9,707,138 | B2 | 7/2017 | Hsiao-Wecksler et al. | |

(Continued)

OTHER PUBLICATIONS

Kauss, M., Schuppan S., Alumni Event Poster Presentation, Fall 2018, Boulder, CO.

(Continued)

*Primary Examiner* — Jacob D Knutson

(57) ABSTRACT

Embodiments described herein are directed to posture assistance devices that may include a motor coupled to a frame, where the frame attaches to a wheelchair. In some cases, the devices include a shaft coupled to the motor, where the motor is configured to rotate the shaft. The devices can also include an extension arm attached to the frame, where the extension arm includes a redirection surface. The extension arm can be selectively adjustable to change the distance between the redirection surface and the shaft. The devices can also include a connection line coupled to the shaft and configured to engage with the redirection surface, such that rotation of the shaft changes a length a fed-out portion of the connection line. The connection line can also include an attachment mechanism that couples the connection line to a user.

17 Claims, 23 Drawing Sheets

(56) References Cited

U.S. PATENT DOCUMENTS

| | | | |
|---|---|---|---|
| 2017/0252240 | A1 | 11/2017 | DuFresne et al. |
| 2020/0324152 | A1 | 10/2020 | Goldish et al. |

OTHER PUBLICATIONS

Kauss, M., Schuppan S., Cindy's Project Design Review, PowerPoint Presentation, Mar. 2019, Boulder, CO.
Kauss, M., Schuppan S., Cindy's PosCure Improve the Quality of Life of Wheelchair Users, PowerPoint Presentation, Mar. 2019, Boulder, CO.
Kauss, M., Schuppan S., Exo-Seat Preliminary Design Review, PowerPoint Presentaton, Oct. 2019, Boulder, CO.
Kauss, M., Schuppan S., Biomedical Engineering Project, PowePoint Presentation, Sep. 2018, Boulder CO.
Kauss, M., Schuppan S., Human Movement Enhancement in a Patient with Multiple Sclerosis, Nov. 2018, Boulder, CO.

* cited by examiner

WHEELCHAIR HARNESS

CROSS REFERENCE TO RELATED APPLICATIONS

This application is a continuation of U.S. patent application Ser. No. 17/522,816, filed Nov. 9, 2021, which claims priority to U.S. Provisional Patent Application No. 63/111,726, filed Nov. 10, 2020, the contents of which are hereby incorporated by reference as if fully disclosed herein.

TECHNICAL FIELD

Embodiments of the present disclosure generally relate to an assistive movement device; and more specifically to posture assistance devices to aid user mobility.

BACKGROUND

Some users have conditions in which they are often unable to move to a desired postural position. Sometimes this may be caused by medical conditions such as, for example multiple sclerosis. Sometimes users experience such conditions long term; other times such conditions are temporary.

SUMMARY

The disclosure describes posture assistance devices, which according to some embodiments include a motor coupled to a frame. The frame can be attached to a wheelchair and a shaft can be coupled to the motor, where the motor is configured to rotate the shaft. An extension arm can be attached to the frame, where the extension arm includes a redirection surface. The extension arm can be selectively adjustable to change a distance between the redirection surface and the shaft. The device can include a connection line coupled to the shaft and configured to engage with the redirection surface, such that rotation of the shaft changes a length a fed-out portion of the connection line. The device can include an attachment mechanism configured to couple the connection line to a user.

In some embodiments, the extension arm includes an adjustable rail, the redirection surface being disposed on the adjustable rail.

In some embodiments, the extension arm includes an attachment rail and an adjustable rail, the attachment rail being attached to the frame, and the adjustable rail being selectively adjustable with respect to the attachment rail.

In some embodiments, the attachment rail includes multiple first holes each configured to receive a pin, and the adjustable rail comprises multiple second holes each configured to receive the pin, the pin being insertable simultaneously in one of first holes and one of the second holes.

In some embodiments the pin is a first pin, and a second pin is insertable simultaneously in a second of the plurality of first holes and a second of the plurality of second holes to create a fixed relationship between the attachment rail and the adjustable rail.

In some embodiments, the frame is configured to be attached to a back of the wheelchair.

In some embodiments, the redirection surface is a surface of a roller wheel.

In some embodiments, the connection line is a belt.

In some embodiments, the belt includes a first belt segment and a second belt segment, wherein the belt further comprises hook and loop fasteners attaching the first belt segment to the second belt segment.

In some embodiments, the device includes a ratchet wheel and a pawl, the ratchet wheel being coupled to the shaft, and the pawl being configured to selectively engage with the ratchet wheel.

In some embodiments, the extension arm is a first extension arm, and the connection line is a first connection line, wherein the posture assistance device further comprises a second extension arm and a second restrainer line.

The disclosure describes posture assistance devices, which according to some embodiments include a motor coupled to a frame. The frame can be attached to a wheelchair and a shaft can be coupled to the motor, where the motor is configured to rotate the shaft. An extension arm can be attached to the frame, where the extension arm includes a redirection surface. The extension arm can be selectively adjustable to change a distance between the redirection surface and the shaft. The device can include a connection line coupled to the shaft and configured to engage with the redirection surface, such that rotation of the shaft changes a length a fed-out portion of the connection line. The device can include an attachment mechanism configured to couple the connection line to a user. The device can also include a controller, where the controller is configured to receive a motor speed signal representing a speed of the motor. In some embodiments, the controller is configured to operate in a lifting mode, wherein in the lifting mode, the controller is configured to send a drive signal to the motor, the drive signal being based on a comparison between the speed of the motor and a reference speed.

In some embodiments, the controller is configured to operate in the lifting mode in response to a first user command, wherein in the lifting mode the torque signal causes the motor to rotate in a first direction that causes the length of the fed out portion of the connection line to decrease.

In some embodiments, the controller is configured to operate in a lowering mode in response to a second user command, wherein in the lowering mode the torque signal causes the motor to rotate in a second direction that causes the length of the fed out portion of the connection line to increase.

In some embodiments, a Hall effect sensor is in a fixed relationship with the frame, the Hall effect sensor being configured to send a proximity signal to the controller when a magnet is in proximity to the Hall effect sensor.

In some embodiments, the magnet is fixed to the connection line at a predetermined location.

In some embodiments, the controller is configured to operate in a stop mode in response to receiving the proximity signal from the hall effects sensor, wherein the controller is further configured to operate in the stop mode in response to receiving a stop command from the user.

Some embodiments include a ratchet wheel coupled to the shaft, wherein, when the controller is operating in the stop mode, the controller is configured to actuate a pawl to engage with the ratchet wheel to maintain the shaft in a static position.

In some embodiments, the extension arm includes an adjustable rail, the redirection surface being disposed on the adjustable rail.

BRIEF DESCRIPTION OF THE DRAWINGS

Corresponding reference characters indicate corresponding parts throughout the several views.

Figure 1:
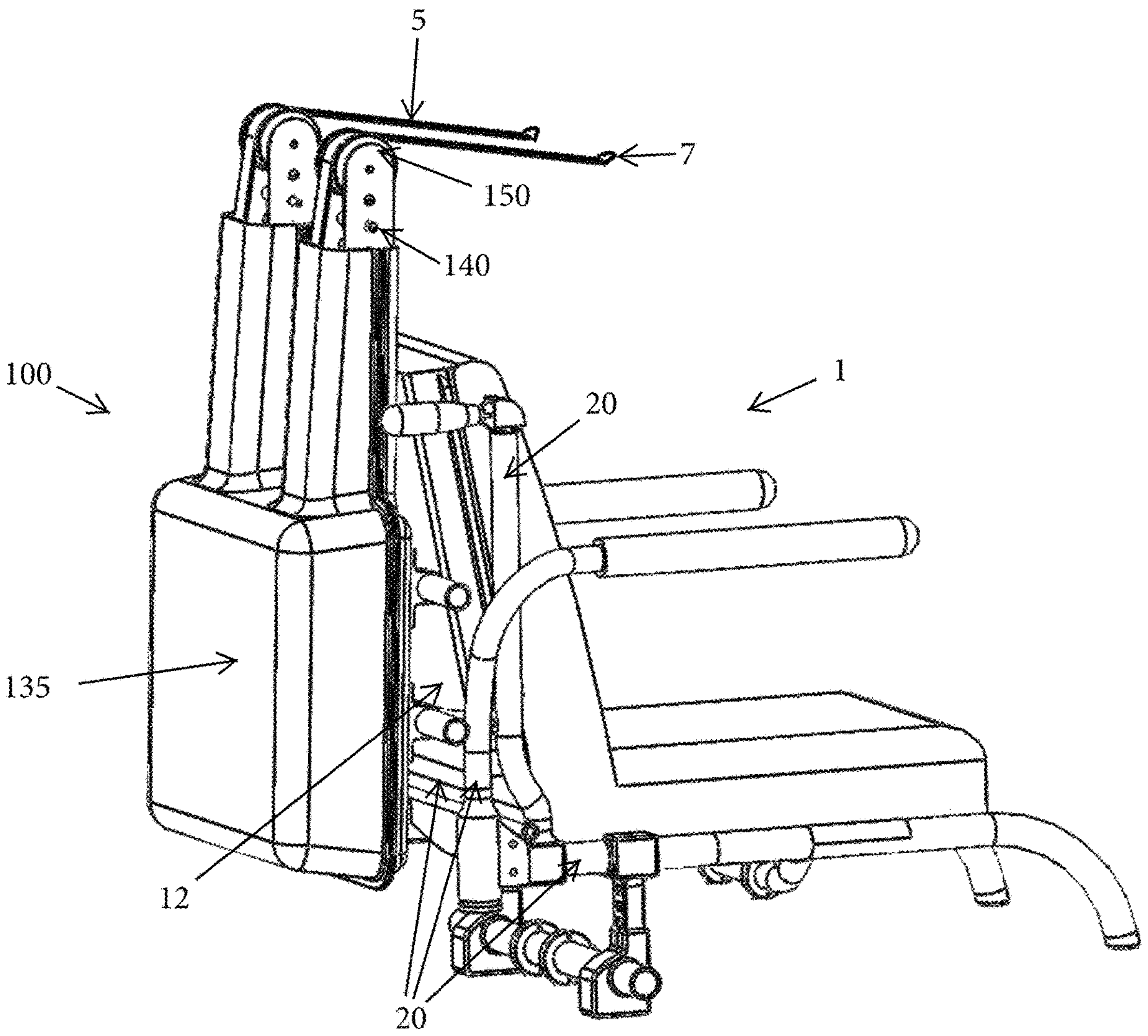
FIG. 1 shows a posture assistance device mounted to the back of a chair, according to one embodiment.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

FIG. 1 shows a posture assistance device 100 according to an embodiment of the present disclosure. Device 100 can be mounted and adjusted to various chairs, including wheel chairs, in order to facilitate posture adjustments. Device 100 can include a control system that responds to user commands and adjusts operation of the device 100 depending on the user's strength.

FIG. 1 shows device 100 coupled to the back 12 of a seat 1 according to one embodiment. The device 100 is coupled to a chair frame 20 of the chair 1. Device 100 is configured to raise, lower, and/or support the torso of a user sitting in the chair 1. This is accomplished using connection lines 5, which are coupled to the user via an attachment mechanism 7. In some modes of operation, the length of a fed-out portion of the connection lines 5 (fed-out from device 100) is adjusted to raise or lower a torso of the user seated in the chair 1. In other modes of operation, the length of a fed-out portion remains constant to support the user in a desired position. Device 100 includes cover 135, according to some embodiments. Device 100 further includes one or more extension arms 140 and a roller wheel 150 disposed on each extension arm 140. The roller wheel 150 redirects the connection line 5 toward a user sitting in the chair 1.

As used herein, the term "coupled" is used in its broadest sense to refer to elements which are connected, attached, and/or engaged, either directly or integrally or indirectly via other elements, and either permanently, temporarily, or removably.

Figure 18:
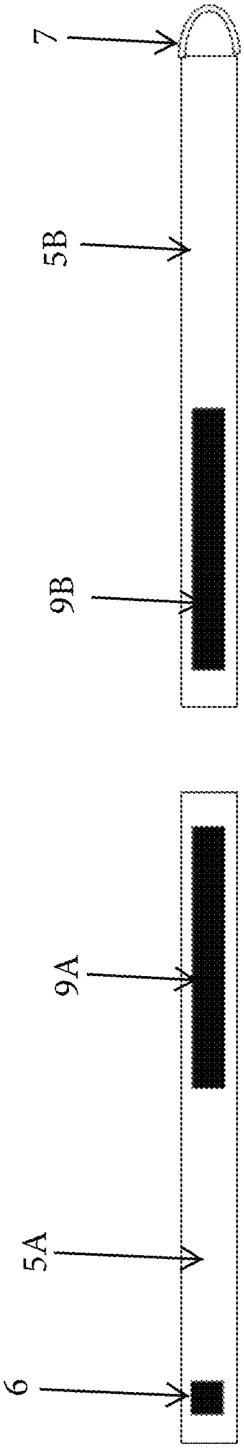
FIG. 18 shows a connection line of the posture assistance device of FIG. 1, according to one embodiment.

In the embodiment shown in FIG. 1, chair 1 is a wheelchair, with the wheels omitted for clarity. In some embodiments, the chair 1 is a wheel chair. In other embodiments, the chair 1 is a stationary chair, a hospital bed, or any item of furniture used for sitting. FIG. 1 shows two connection lines 5; some embodiments include one connection line 5, or more than two connection lines 5. In some embodiments, the connection line 5 is a belt. In other embodiments the connection line is a cable, rope, cord, and/or strap. FIG. 18 illustrates an alternative connection line 5A, 5B, according to some embodiments.

Figure 2B:
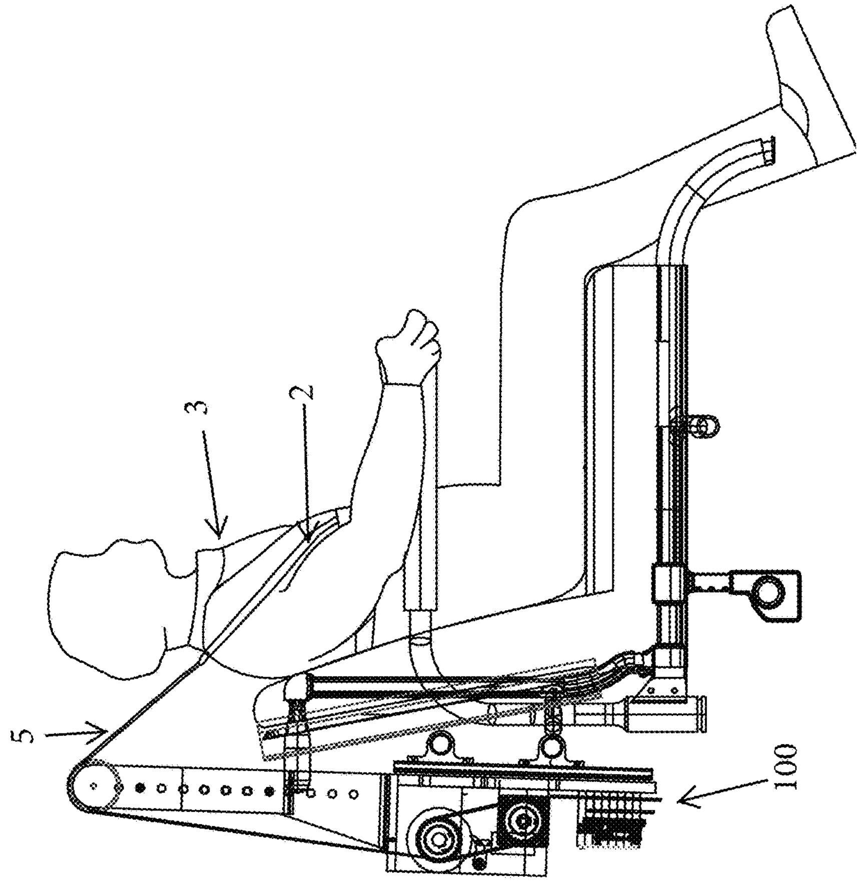
FIGS. 2A and 2B show user operation of the posture assistance device of FIG. 1.
Figure 2A:
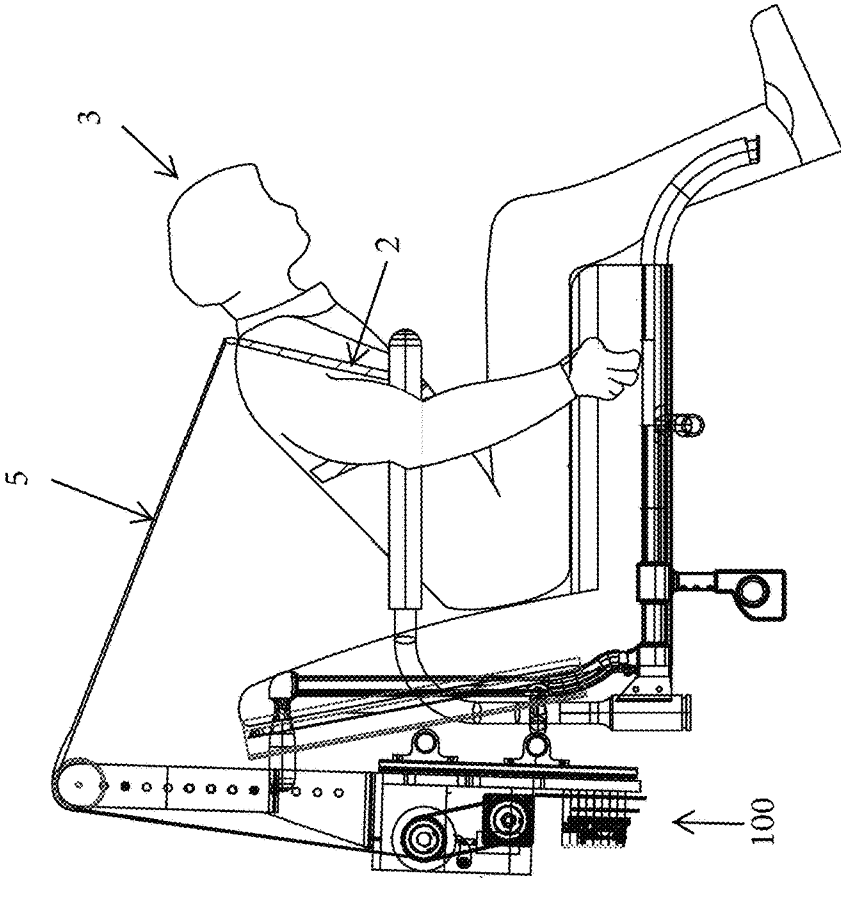

FIGS. 2A and 2B show the use of device 100 according to one embodiment. FIGS. 2A and 2B are side views with a cutaway views of the device 100 without the cover 135. A vest 2 worn by the user 3 is coupled to the connection line 5; for example, connection line 5 may couple to vest 2 (or other garment, harness, strap, pad, undergarment, and/or the like) at an area above the waist of the user, and/or above the chest of the user, and/or above the shoulder of the user, and/or at a top of the user's torso, according to some embodiments of the present disclosure. In FIG. 2A, the user 3 is in a "down" position. If the user 3 desires assistance to sit upright, he or she may give a raising command to the device 100 indicating a desire to be lifted up. The user 3 may give the raising command by pushing a button or using a voice command (for example, as discussed in greater detail in relation to FIGS. 13-16). In response to the command, the device 100 shortens a length of the fed-out portion of the connection line 5, to lift the user to the upright position shown in FIG. 2B.

A user 3 in the upright position shown in FIG. 2B might desire to be let down. In this case, the user 3 may give a lowering command to the device 100 indicating a desire to be let down. The user 3 gives the lowering command by pushing a button or by giving a voice command (for example, as discussed in greater detail in relation to FIGS. 13-16). In response to this command, the device 100 lengthens a portion of the fed-out portion of the connection line 5, to let the user down to the position shown in FIG. 2A and to give the user sufficient slack to move freely, according to one embodiment.

While the user 3 is being raised or lowered, the user 3 may give a stop command indicating a desire for the device 100 to stop raising or lowering the user and for the connection line 5 to be locked in place, according to some embodiments.

Figure 3:
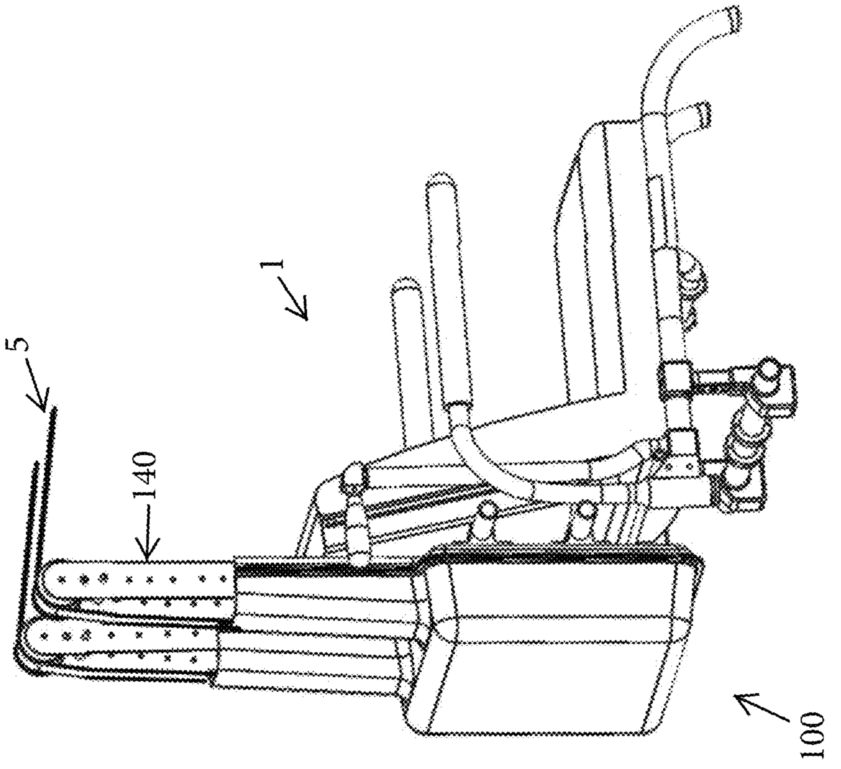
FIGS. 3 and 4 show alternate arrangements of the posture assistance device of FIG. 1.

FIG. 3 shows device 100 with the extension arms 140 in an extended position as compared to the position of the extension arms 140 in FIG. 1. In some embodiments, the length of the extension arms 140 are adjustable to accommodate a specific chair or wheelchair. The length of the extension arms 140 affects the angle at which the connection line 5 raises the user. The extension arms 140 are adjustable so that the connection line 5 may raise the user at an angle of optimal comfort and lifting assistance. Increasing the length of the extension arms 140 increases the angle at which the connection line 5 lifts the user, while decreasing the length of the extension arms 140 decreases the angle at which the connection line 5 lifts the user. An optimal angle of the connection line 5 allows the user's torso to naturally and comfortably rotate from the down position (see FIG. 2A) to the upright position (see FIG. 2B). The optimal angle of the connection line 5 may be achieved for each user by adjusting the length of the extension arms 140. The length of the extension arms 140 that achieves the optimal angle of the connection line 5 may differ based on various factors such as the height of the user, the model of the chair 1, and the position of the device 100 with respect to the chair 1. The adjustable nature of the extension arms 140 thus allows an optimal angle of the connection line 5 to be achieved in a variety of different circumstances. The extension arms 140 are described in greater detail in relation to FIGS. 14 and 15.

Figure 4:
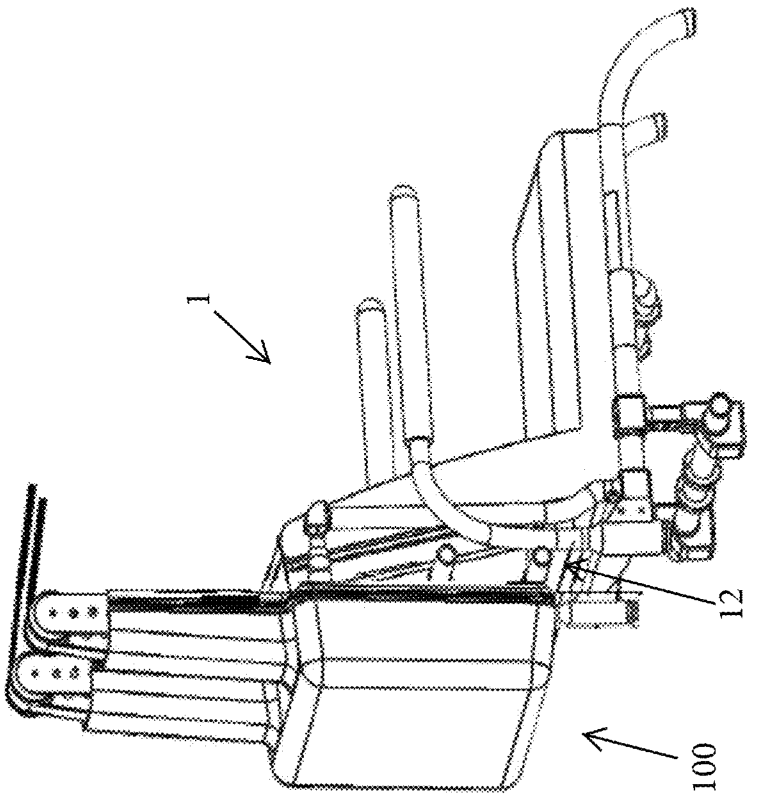

FIG. 4 shows device 100 mounted at a higher position with respect to the chair 1 as compared to the position of device 100 in FIG. 1. The attachment mechanism (described in greater detail in relation to FIGS. 7-12C) allows the device 100 to be mounted at various vertical positions on the back 12 of the chair 1.

Figure 5:
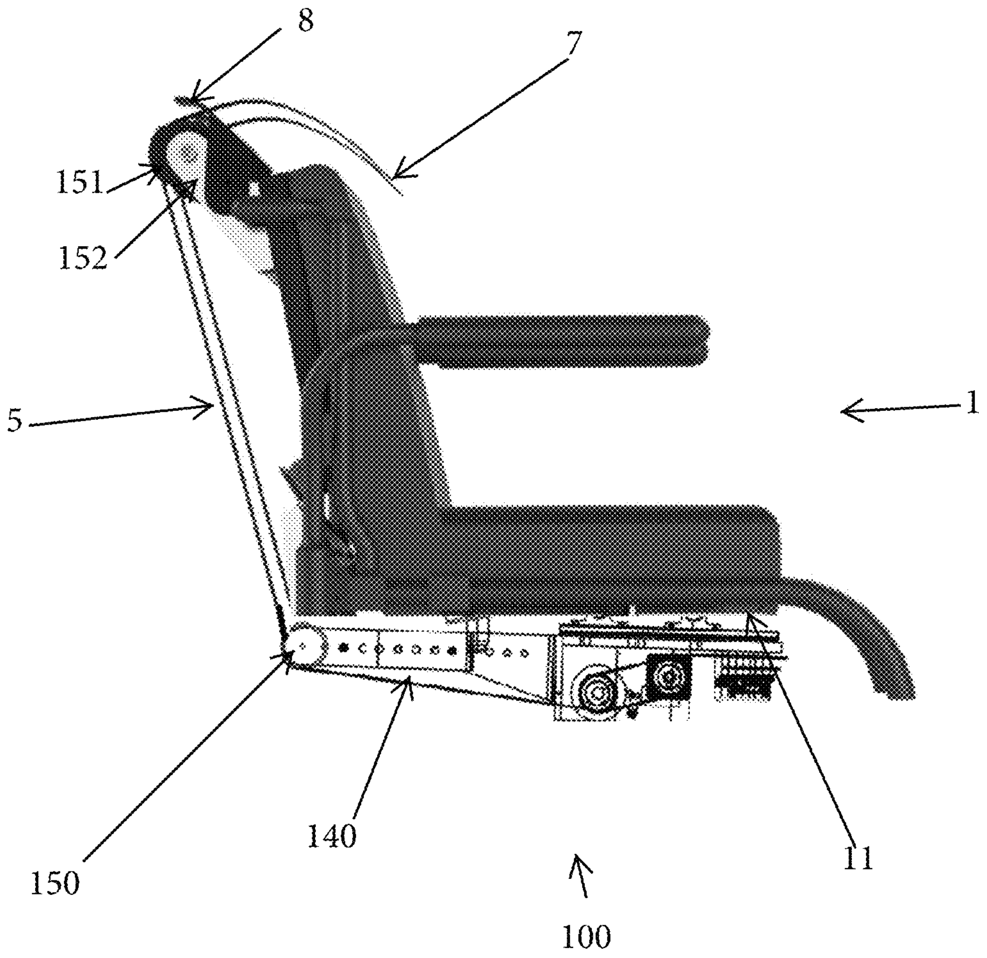
FIG. 5 shows the posture assistance device of FIG. 1 mounted to the bottom of the chair.

FIG. 5 shows device 100 mounted to a bottom 11 of the chair 1. FIG. 5 is a side view of the chair 1 with a cutaway view of the device 100 without the cover 135. In this arrangement, a mounted set of roller wheels 151 is mounted to the chair 1 on upper frames 152. The mounted set of roller wheels 151 directs the connection line 5 from the device roller wheels 150 to the user in the chair 1. The device 100 may be adjusted in a forward/backward direction with respect to the chair 1 with the attachment mechanism (described in greater detail in relation to FIGS. 7-12C). In some cases, a hair shield 8 is attached one or more upper frames 152 to discourage the user's hair from being caught in the mounted roller wheels 151. Connection line 5 may pass through a slot in the hair shield 8, according to some embodiments.

Figure 6:
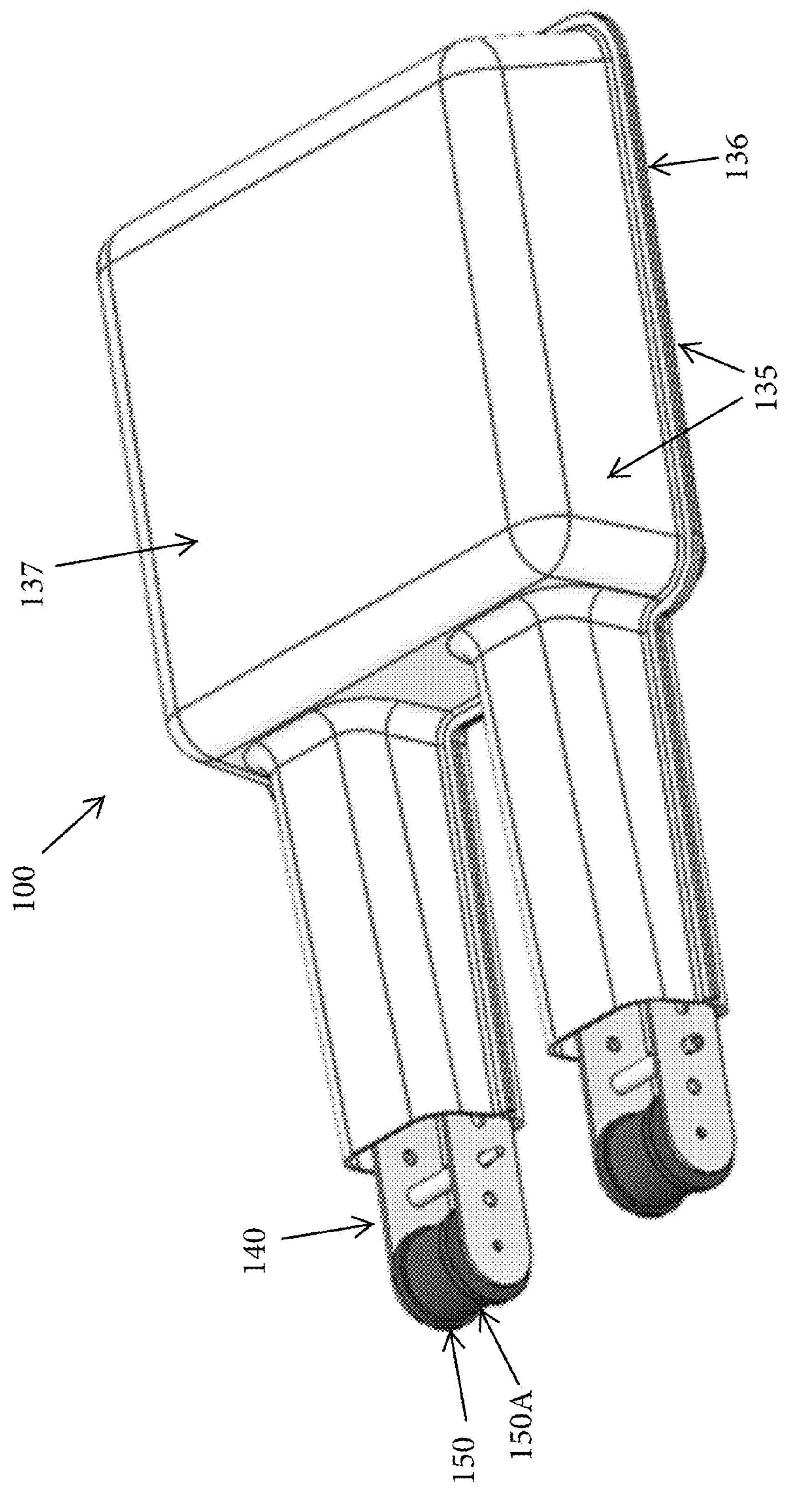
FIGS. 6 and 7 show the external views of the posture assistance device of FIG. 1.

FIG. 6 shows a top, front perspective view of device 100 according to some embodiments. Cover 135 includes an outer cover 137 and an inner cover 136. Cover 135, encloses, covers, and/or surrounds mechanical components (shown in more detail in FIGS. 13 and 14) of the device 100. Outer cover 137 includes a body outer cover 137A that encloses the motor 110 (see FIGS. 13 and 14), and arm outer covers 137B that each enclose a portion of a respective extension arm 140 (see FIGS. 4 and 5) according to some embodiments. In some embodiments, outer cover 137 is all or partially plastic. In other embodiments, outer cover 137 is all or partially any other light material. A roller wheel 150 is coupled to each extension arm 140. The surface 150A of each roller wheel 150 is a redirection surface operable to redirect the connection line 5.

Figure 7:
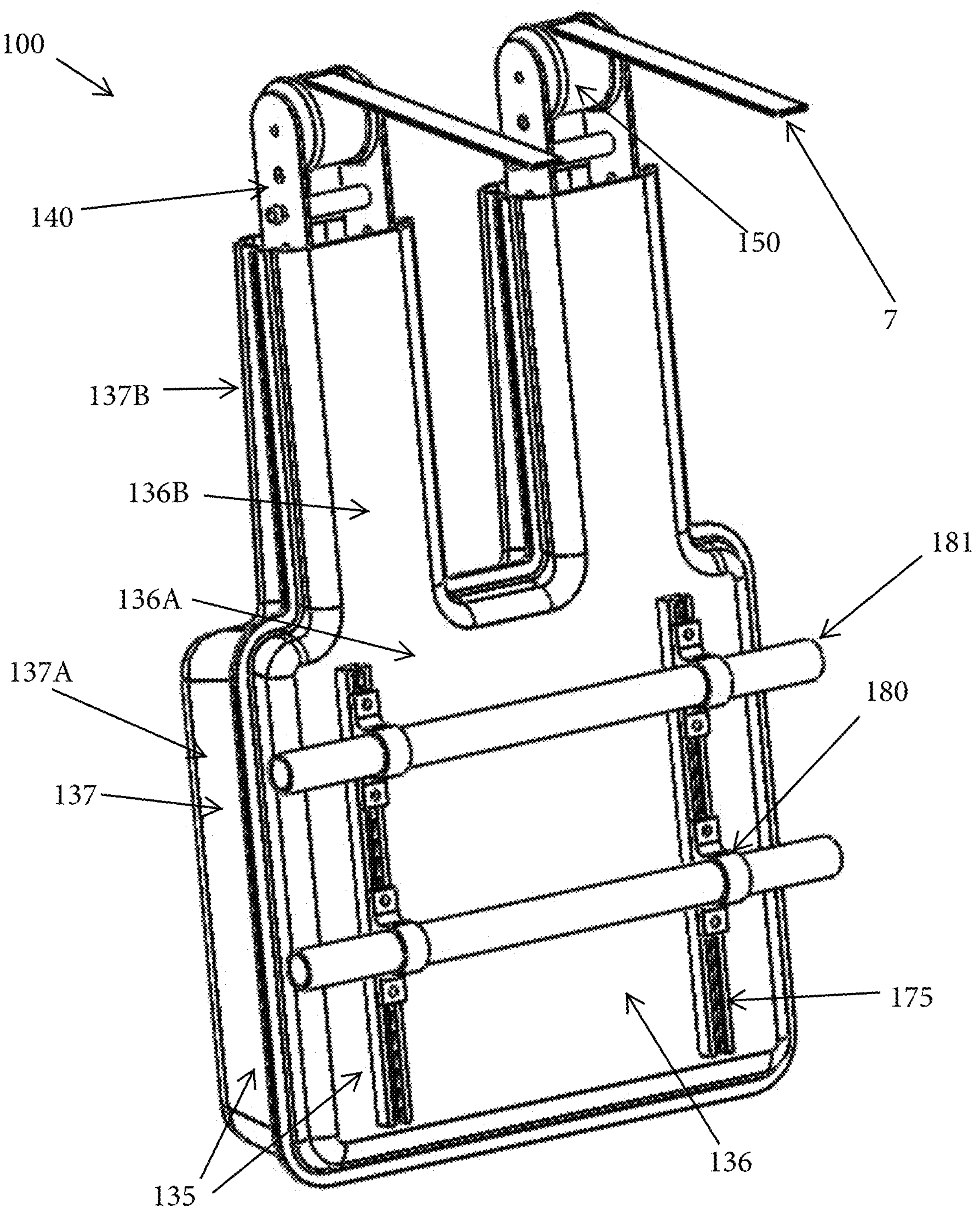

FIG. 7 shows a bottom, back perspective view of device 100. The inner cover 136 encloses the device 100 on the side facing the seat 1 (see FIG. 1). The inner cover 136 includes a body inner cover 136A that encloses the motor 110 (see FIGS. 4 and 5), and arm inner covers 136B that each enclose a portion of a respective extension arm 140 (see FIGS. 4 and 5). The inner cover 136, is configured to engage with the outer cover 137 to enclose the motor 110 and other components. In one embodiment, the inner cover 136 is plastic. In other embodiments, the inner cover 136A, 136B may be any other light material.

Figure 14:
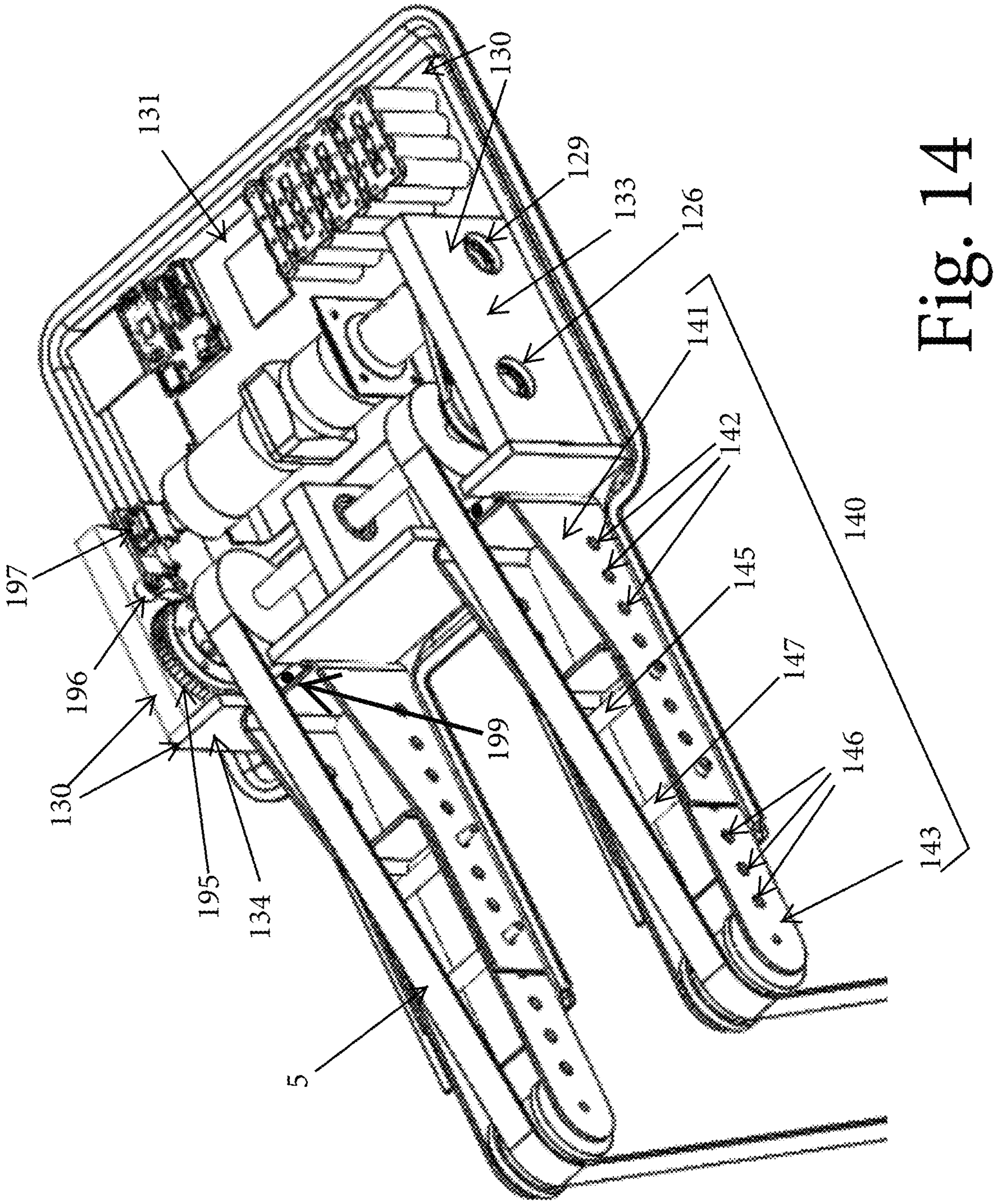

In one embodiment, one or more tracks 175 are attached to cover 135. For example, two tracks 175 may be attached to an outside of the body inner cover 136A. The tracks 175 may be affixed to a bottom plate 131 of frame 130 (FIG. 14), for example via a screw or bolt attachment through the main inner cover 136A (as shown in FIG. 14) for structural support, with the main inner cover 136A sandwiched between the tracks 175 and the bottom plate 131, according to some embodiments. Cross members 181, which in some cases may be tubes, are mounted onto the tracks 175 with one or more mounting members 180, which in some cases may be mounting feet. The mounting members 180 are secured to the tracks 175, for example with T-nuts, bolts, screws, or other attachment components. Each cross member 181 may be positioned at various vertical locations along the length of the tracks 175, giving the device 100 adaptability to be connected to the back or bottom of a variety of different models of chairs and wheel chairs. In one embodiment, the cross members 181 are aluminum. However, the cross members 181 may be any material or shape capable of providing the required structural support for mounting the device 100. While FIG. 7 shows two cross members 181, in some embodiments the device 100 may include more than two cross members 181 or, alternatively, the device 100 may include only one cross member 181, depending on the requirements for mounting the device 100 to a specific model chair or wheel chair.

The variable position of the mounting members 180 with respect to the tracks 175 allows the device 100 to be adjusted vertically with respect to the back of the chair 1. For example, FIG. 4 shows a device 100 mounted in a higher vertical position with respect to the chair 1, as compared to the position the device 100 in FIG. 1.

When the device 100 is mounted on the bottom of the chair 1, as shown in FIG. 5, the variable position of the mounting member 180 with respect to the tracks 175 allows the device to be adjusted forward and backward with respect to the bottom of the chair 1.

The arrangement of tracks 175 and cross members 181 as shown in FIG. 7 may be used in conjunction with a variety of mounting arrangements, at least three of which are discussed below. However, the arrangement of tracks 175 and cross members 181 may be used in conjunction with other mounting arrangements.

Figure 8:
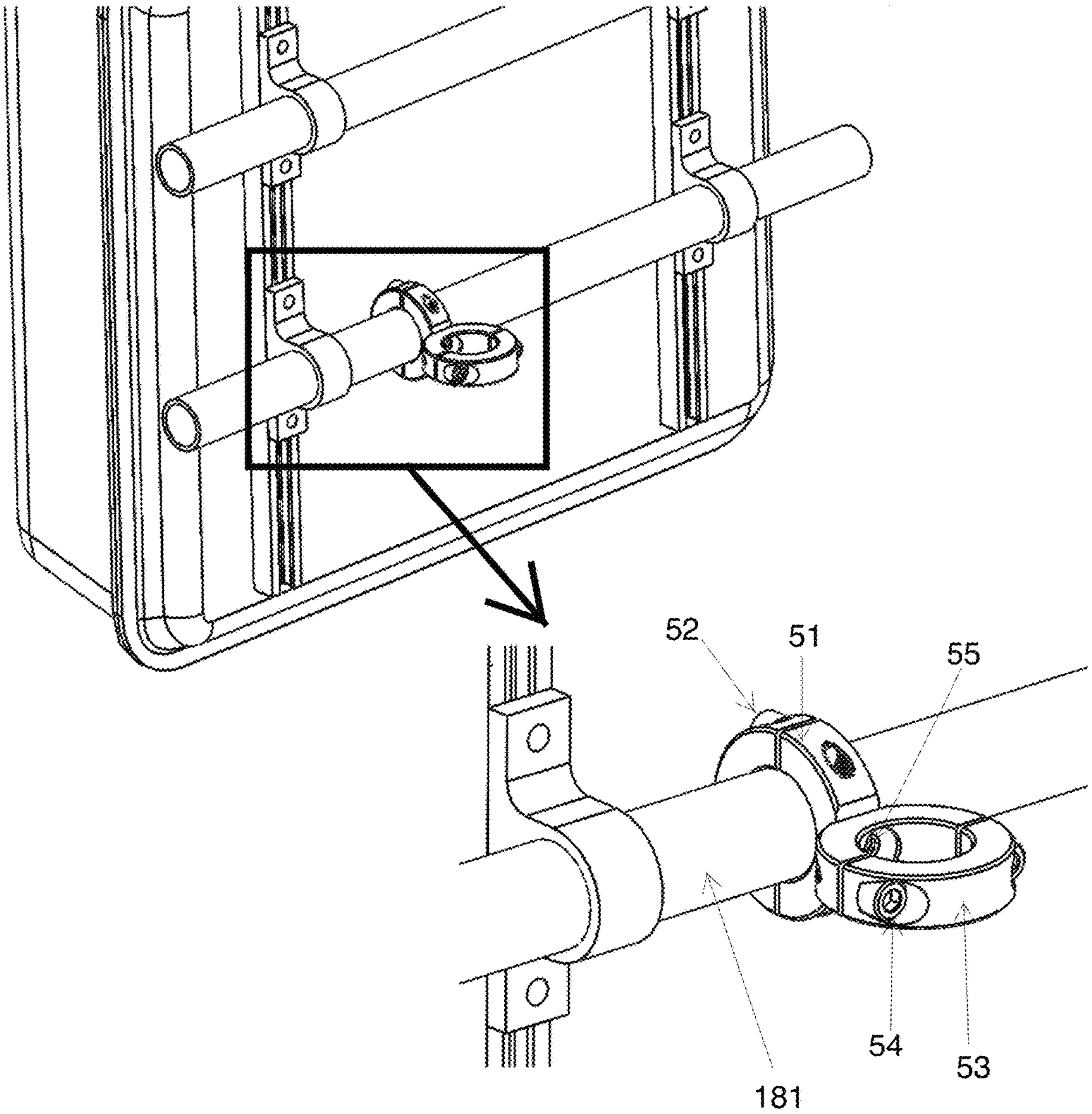
FIG. 8 shows a mounting structure for the posture assistance device of FIG. 1 according to some embodiments.

FIG. 8 shows one possible mounting arrangement. A shaft collar 51 may be secured at any desired position along the cross member 181. The shaft collar 51 is secured to the cross member 181. In one example, the shaft collar 51 is secured to the cross member 181 by tightening a screw 52. A frame collar 53 is secured to the shaft collar 51. In some embodiments, the frame collar 53 is secured to the shaft collar 51 with a connecting screw 55, or alternatively with a bolt or another fastener. The frame collar 53 may be secured at any suitable angle with respect to the shaft collar 51 to engage with the frame of the chair 1. The frame collar 53 is secured to the frame of the chair (for example chair frame 20 shown in FIG. 1). In one example, the frame collar 53 is secured to the frame of the chair by tightening a screw 54. The frame collar 53 may have a diameter that is the same or different from the shaft collar 51, depending on the diameter of the frame of the chair, according to some embodiments.

Multiple sets of shaft collars 51 and frame collars 53 may be used to mount the device 100 to the chair 1.

Figure 9:
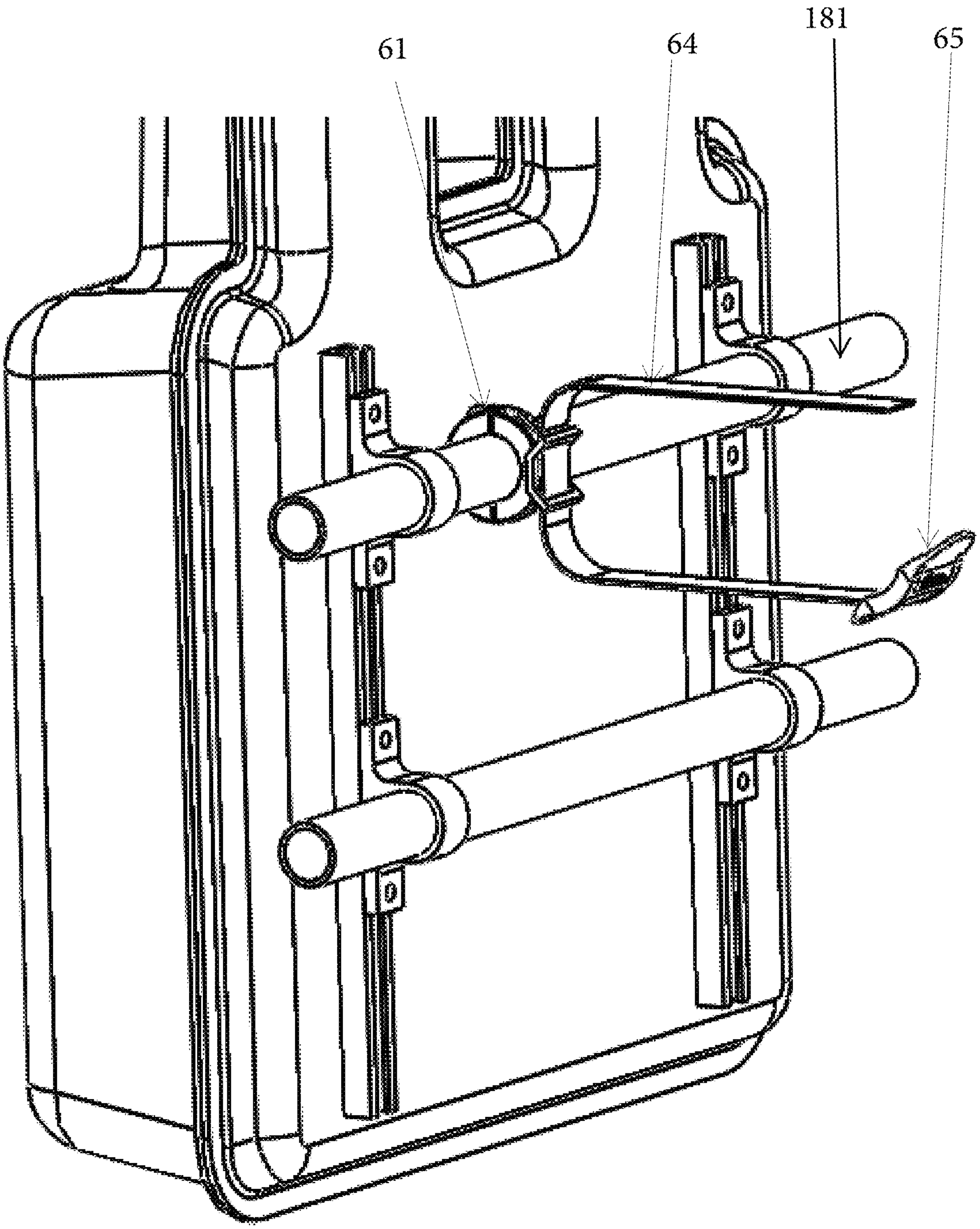
FIGS. 9 and 10 show another mounting structure for the posture assistance device of FIG. 1 according some embodiments.
Figure 10:
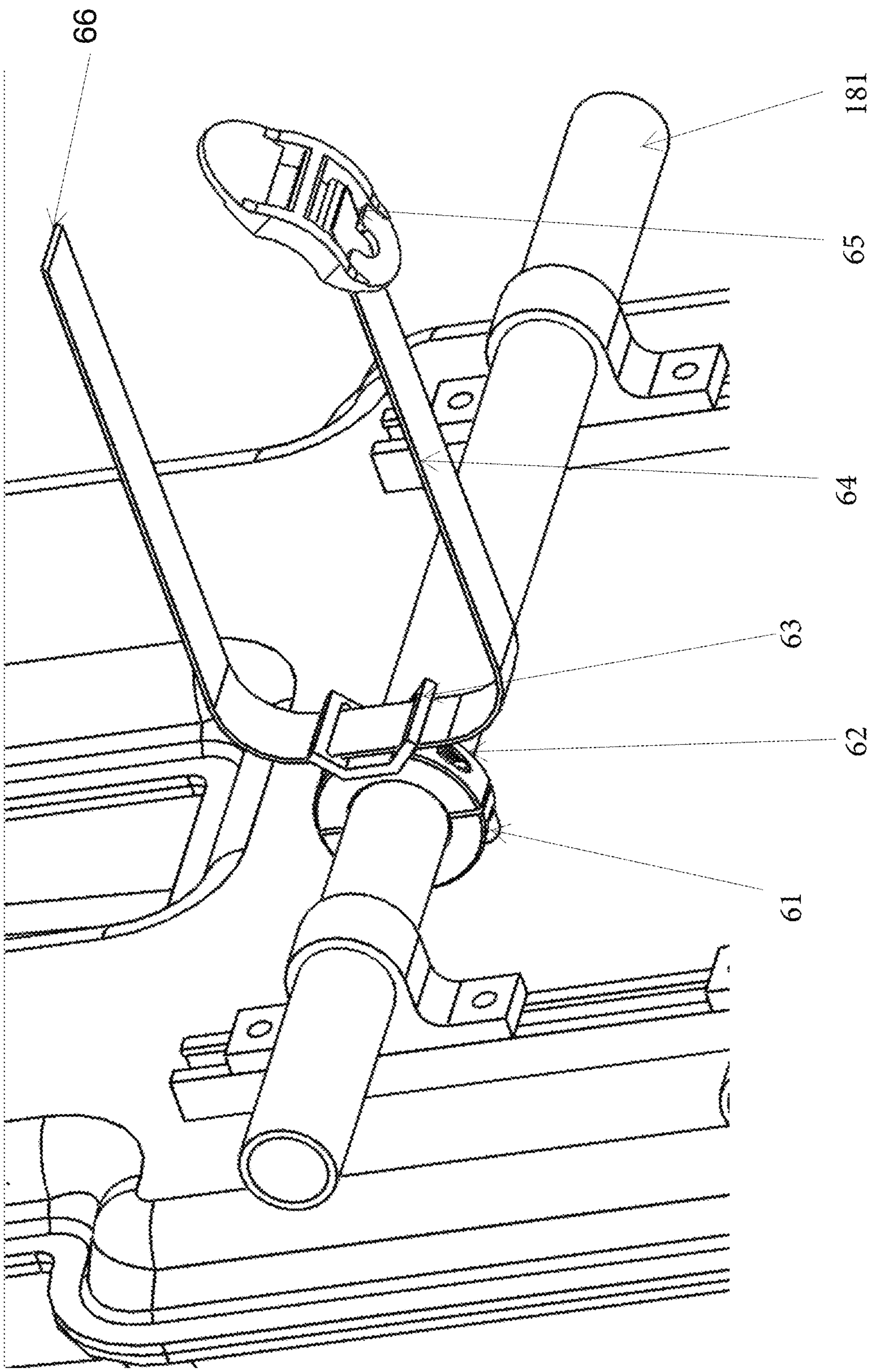
Figure 11:
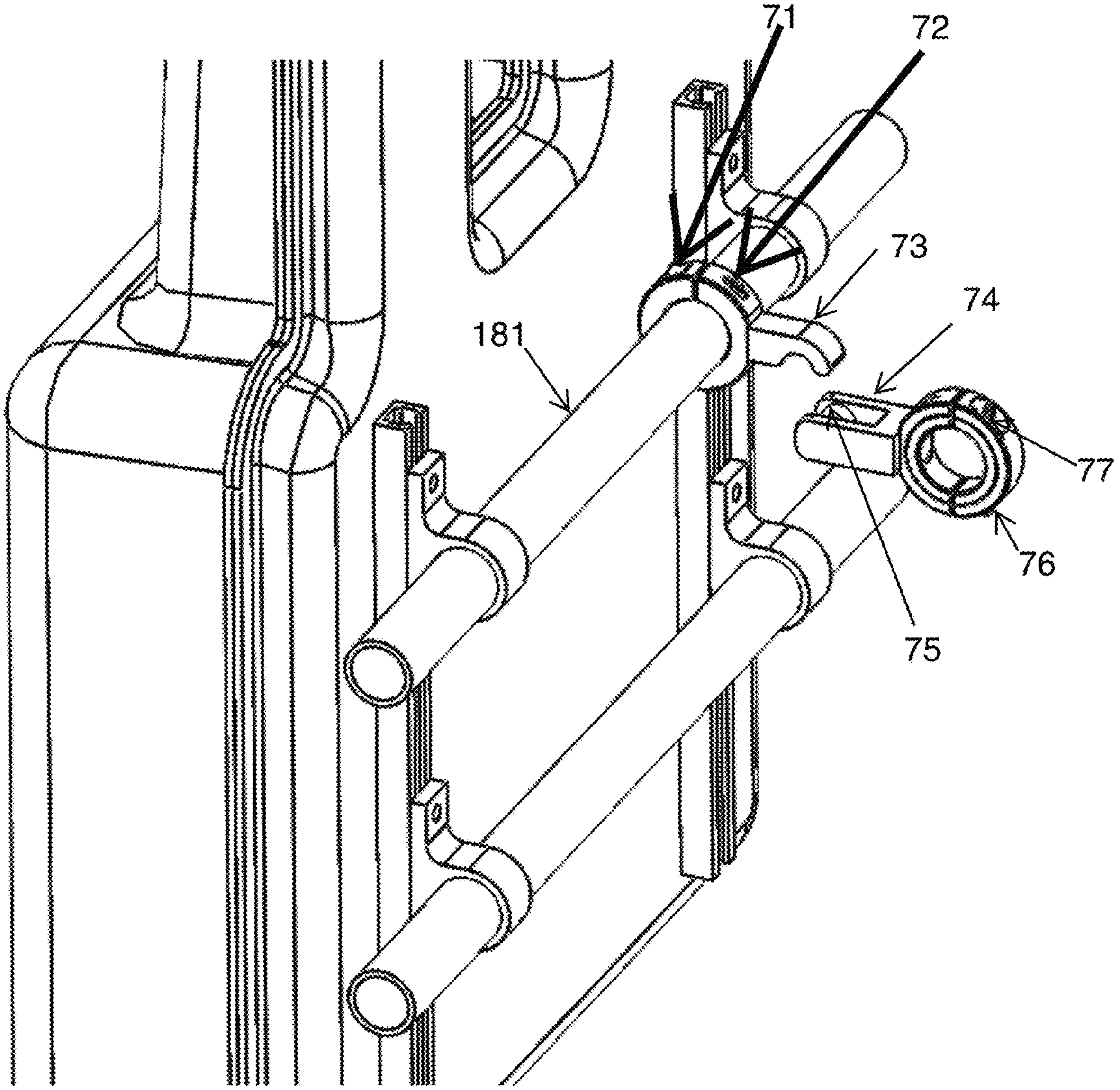
FIG. 11-12C show another mounting structure for the posture assistance device of FIG. 1 according some embodiments.

FIGS. 9 and 10 show an additional and/or alternative mounting arrangement, according to some embodiments. A shaft collar 61 may be secured at any desired position along the cross member 181. The shaft collar 61 is secured to the cross member 181. In one example, the shaft collar 61 is secured to the cross member 181 by tightening a screw 62. A bracket 63 is coupled to the shaft collar 61. In some embodiments, the bracket 63 is affixed to the shaft collar 61 with a screw, or a bolt, or another fastener. The bracket 63 may be mounted in any rotational position relative to the shaft collar 61. A strap 64 passes through the bracket 63. A buckle 65 on the strap 64 allows the strap 64 to be tightened around one or more parts of a wheelchair frame by passing an end 66 of the strap 64 through the buckle 65. This mounting arrangement can mount device 100 to wheelchairs that have difficult-to-reach attachment points, for example.

In one embodiment, the strap 64 is fabric. In other embodiments, the strap 64 is rubber, polymer, nylon, string, rope, braided textile, woven textile, cord, chain, and/or any strong, flexible material.

FIGS. 11 and 12A-12C show yet another alternative mounting arrangement of device 100, according to some embodiments. A shaft collar 71 may be secured at any desired position along the cross member 181. The shaft collar 71 is secured to the cross member 181. In one example, the shaft collar 71 is secured to the cross member 181 by tightening a screw 72. A hook 73 is coupled to the shaft collar 71. In some embodiments, the hook 73 is affixed to the shaft collar 71 with a screw, or a bolt, or another fastener. The hook 73 engages with a cylindrical element 75 on a bracket 74, such that the cylindrical element 75 bears weight from the device 100. The bracket 75 is coupled to a mounting collar 76. In some embodiments, the bracket 75 is affixed to the mounting collar 76 with a screw, or a bolt, or another fastener. The mounting collar 76 is secured to a chair frame (for example, the chair frame 20 in FIG. 1). The hook 73 and the bracket 74 may be aluminum or any suitable material capable of bearing a structural load.

Figure 12B:
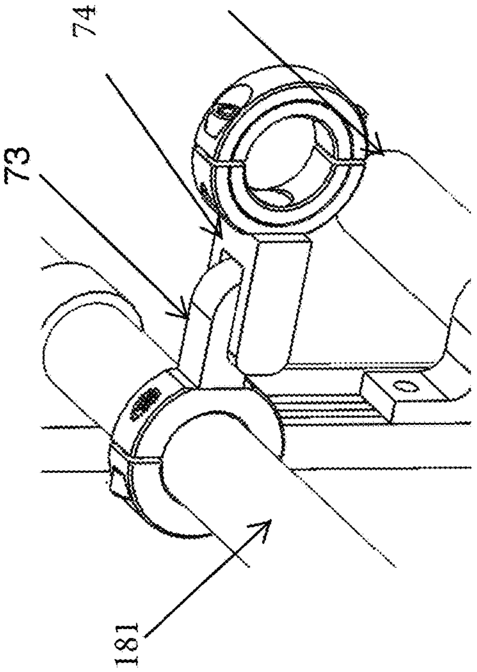
Figure 12C:
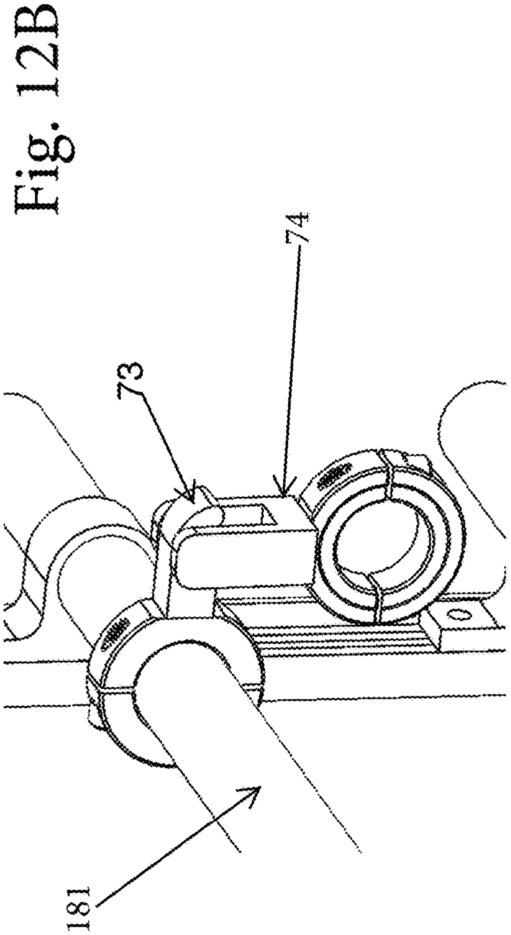
Figure 12A:
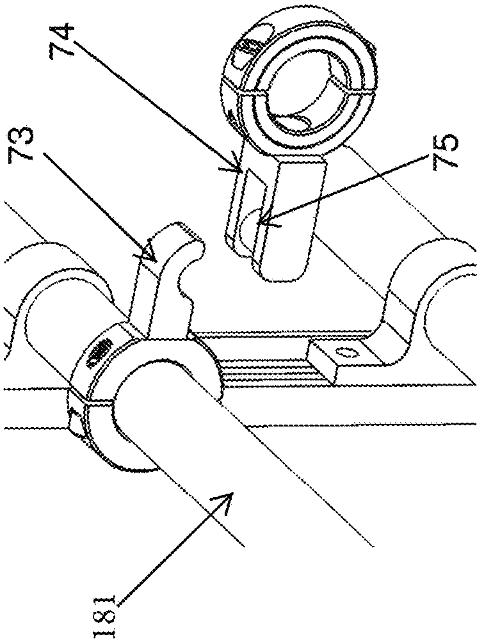

FIG. 12A shows a separated view of the hook 73 and bracket 74. FIG. 12B shows a view in which the hook 73 is engaged with a horizontal bracket 74. FIG. 12C shows a view in which the hook 73 is engaged with a vertical bracket 74.

The collars 51, 53, 61, 71, 76, may be split collars each having two halves that may be screwed together to tighten around a cross member 181 or the chair frame.

Any combination of the mounting arrangements described above may be used to mount the device 100 to the chair 1. The use of the rails 175 and cross members 181 in conjunction with different mounting arrangements allows the device 100 to be mounted to a variety of commercial chairs and wheelchairs.

Figure 13:
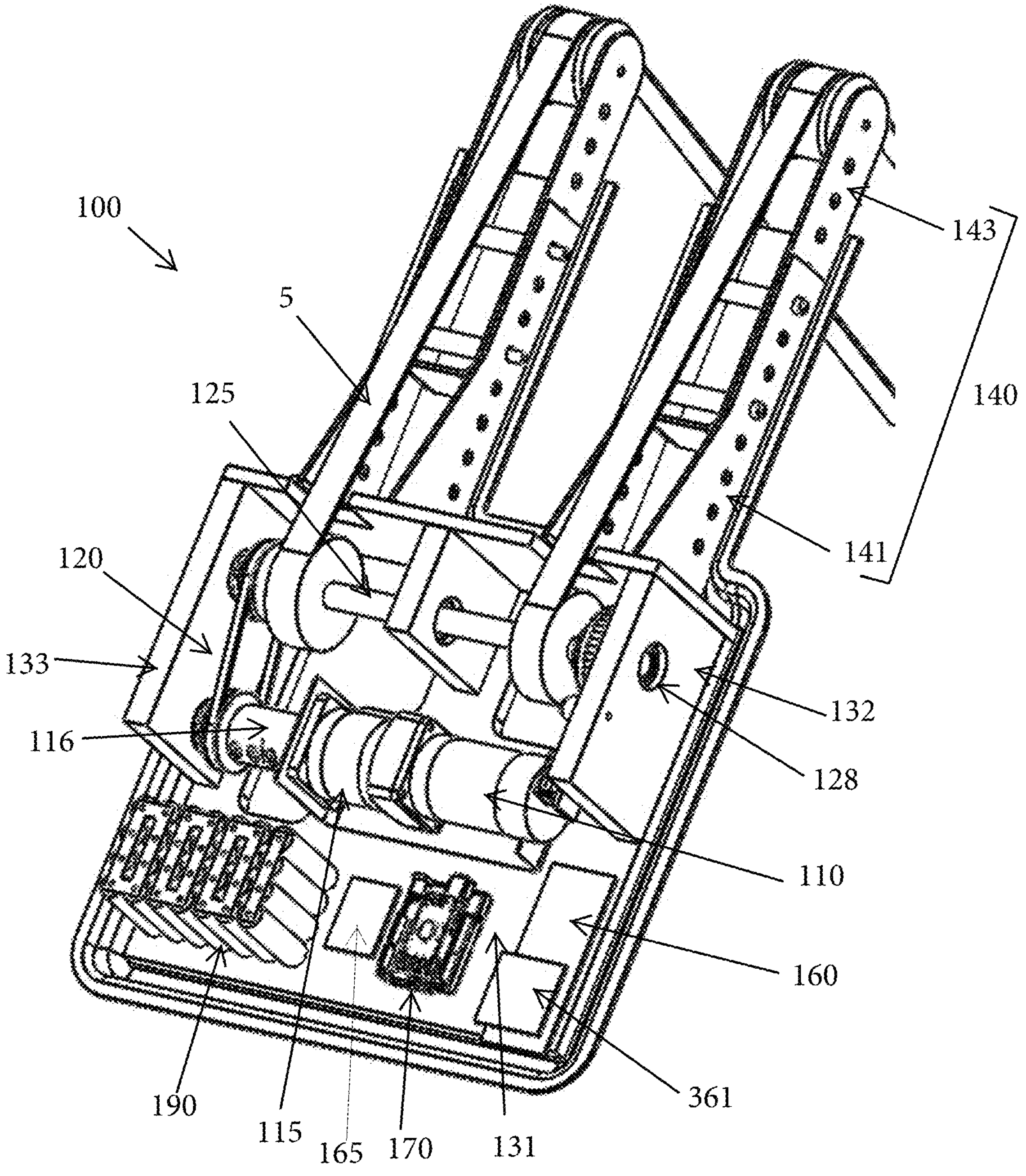
FIGS. 13 and 14 show internal views of the posture assistance device of FIG. 1.

FIG. 13 shows an internal view of device 100 according to one embodiment. The motor 110 is coupled to a gearbox 115, which drives the motor shaft 116. A timing belt 120 transmits torque from the motor shaft 116 to a belt shaft 125. In one embodiment the timing belt 120 has a 1:1 gear ratio from the motor shaft 116 to the belt shaft 125. In some embodiments, the timing belt may have a 1:2 ratio or any other ratio that achieves an appropriate torque for the belt shaft 125. Some embodiments include alternate arrangements for transmitting torque from the motor shaft 116 to the belt shaft 125. For example, one or more gears may couple the motor shaft 116 to the belt shaft 125. In other embodiments, the belt shaft 125 has the same rotational axis as the motor 110 and the motor 110 or gearbox 115 directly rotates the belt shaft 125.

Each connection line 5 is coupled to the belt shaft 125. Rotation of the belt shaft 125 in a clockwise direction decreases the length of the fed-out portion of the connection line 5, and rotation of the belt shaft 125 in a counter-clockwise direction increases the length of the fed-out portion of the connection line 5. Other embodiments use the reverse arrangement such that the rotation of the belt shaft 125 in a clockwise direction increases the length of the fed-out portion of the connection line 5, and rotation of the belt shaft 125 in a counter-clockwise direction decreases the length of the fed-out portion of the connection line 5.

The belt shaft 125 may have clamps to secure the end of each connection line 5 to the belt shaft 125. Alternatively, there may be slots in the belt shaft 125 such that the end of the connection line 5 may pass through the slot, loop around a portion of the belt shaft, 125, and be sewn to an adjacent portion of the connection line 5. The connection line 5 may also be secured to the belt shaft 125 by any other suitable arrangement ensuring that the connection line 5 remains coupled to the belt shaft 125 during rotation of the belt shaft 125.

In an alternate embodiment, the motor and/or gearbox 115 may directly rotate the belt shaft 125.

The device 100 includes frame 130, according to some embodiments. The frame 130 includes the bottom plate 131, a first side wall 133, a second side wall 132, and a front wall 134.

The battery 190 provides power to various components of the device 100. The power regulation board 165 receives power from the battery 190 and distributes power to various components at appropriate voltages. The motor control board 160 includes a main microcontroller unit (MCU) 362. A voice processing board 170 processes voice commands from the user. The battery 190, voice processing board 170, and motor control board 160 are attached to the bottom plate 131, in some embodiments. Motor control board 160 may support Brushless DC motor (BLDC) drive stage board 361 according to some embodiments. In some embodiments, the battery 190 and the boards 160, 165, 170, 361 are each be attached to the bottom plate 131 directly. In other embodiments some of all of the battery 190 and the boards 160, 165, 170, 361 are indirectly attached to the bottom plate 131 via any number of intervening components.

FIG. 14 shows another front and side perspective internal view of device 100. In some embodiments, device 100 includes two extension arms 140; in other embodiments, device 100 includes one extension arm 140; in yet other embodiments, device 100 includes more than two extension arms 140. Extension arm 140 may include a fixed rail 141 and an adjustable rail 143. The fixed rail 141 is coupled to the front wall 134 the frame 130. In one example, the fixed rail 141 is fixedly coupled to the front wall 134 of the frame 130 by bolts, welding, brazing, or any other attachment technique. A roller wheel 150 is coupled to each adjustable rail 143. An overall length of the extension arm 140 may be adjusted by adjusting a position of the adjustable rail 143, thus adjusting a distance between the roller wheel 150 and the belt shaft 125.

In some embodiments, the adjustable rail 143 includes a smooth, stationary surface instead of a roller wheel, such that the connection line 5 may slide over the smooth stationary surface, which redirects the connection line 5 toward the user.

In some embodiments, an adjustable rail 143 may be used without a fixed rail 141. For example, the adjustable rail 143 may be directly secured to the frame 130 of the device 100 at various positions. In other embodiments, the extension arm 140 includes rods coupled by adjustable hinges, which can be secured at different positions to achieve an adjustable overall length. In other embodiments, the overall length of the extension arm 140 may be adjustable by means of one or more folding mechanisms, one or more sliding mechanisms, and/or one or more telescoping mechanisms, to make the distance between the roller wheel 150 and the belt shaft 125 adjustable.

FIG. 14 shows the internal components of the device 100 supported by a frame 130, according to some embodiments. The motor shaft 116 is supported by a bearing 129 in the first side wall 133 (see FIG. 14). The belt shaft is supported by a bearing 126 in the first side wall 133 (see FIG. 14). The belt shaft 125 is also supported by a bearing 128 in the second side wall 132 (see FIG. 13). The belt shaft 125 is also supported by a center support 136 with a bearing 127 (see FIG. 16). The frame 130 is aluminum or any other material capable of providing sufficient structural support.

According to some embodiments, one or more proximity sensors 199 are attached to the frame 130. The proximity sensor 199 is configured to detect the proximity of a magnet 6 that is attached to the connection line 5, and to send a signal to the controller 362. The proximity sensor 199 may send a "1" to the controller 362 when the magnet 6 is close to the sensor 199, indicating that the connection line 5 is in the upright position. In one embodiment, the proximity sensor 199 is a Hall effect sensor.

Figure 15:
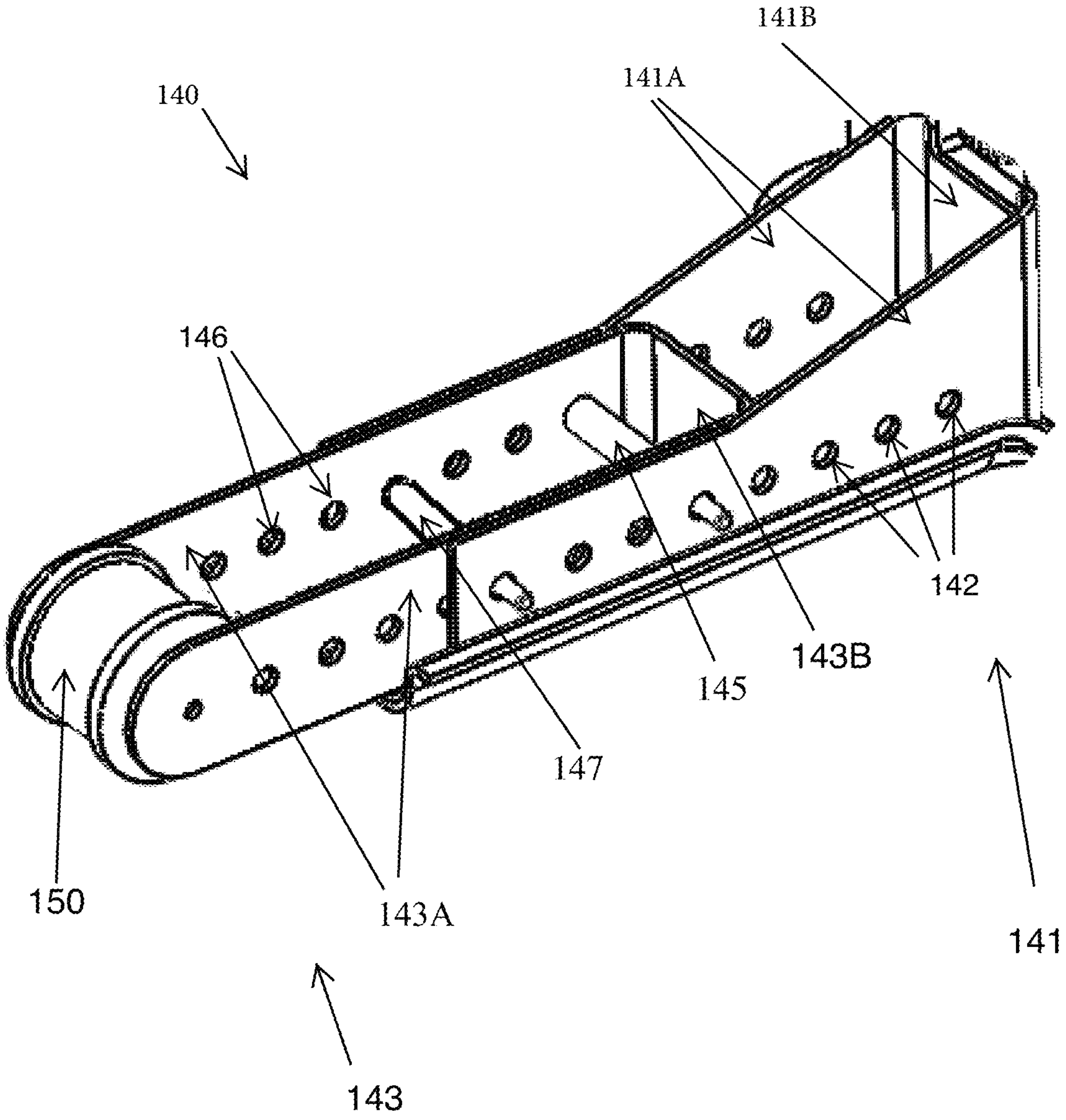
FIG. 15 shows an extension arm of the posture assistance device of FIG. 1.

In some embodiments, as shown in FIG. 15, the fixed rail 141 may include two side walls 141A and an end wall 141B, with a plurality of holes 142 in each side wall 141A. The adjustable rail 143 may include two side walls 143A and an end wall 143A, with a plurality of holes 146 in each side wall 143A. The side walls 143A of the adjustable rail 143 are distanced apart from each other so as to fit securely between the side walls 141A of the fixed rail 141. A first pin 145 and a second pin 147 are inserted into the holes 142, 146 on each side wall 141A, 143A to secure the fixed rail 141 to the adjustable rail 143. The plurality of holes 142, 146 on each rail 141, 143, allows the position of the adjustable rail 143 to be adjusted with respect to the fixed rail 141, thus adjusting a position of the roller wheel 150 with respect to the belt shaft 125.

In some embodiments, more than two pins are used to secure the fixed rail 141 to the adjustable rail 143. In other embodiments, only one pin is used, and the fixed rail 141 provides rotational structural support to the adjustable rail 143, for example with one or more flanges or one or more additional walls. In some embodiments, one or more of the pins only pass through one side wall of the fixed rail 141A and one side wall of the adjustable rail 143A.

In some embodiments, alternate mechanisms may be used to secure the adjustable rail 143 to the fixed rail 141 instead of or in addition to the pins 145, 147. For example, the adjustable rail 143 can be secured to the fixed rail 141 with one or more clamps, one or more bolts, one or more screws, one or more pins, one or more collars, or any combination thereof.

In some embodiments, the fixed rail 141 and/or the adjustable rail 143 have more than two side walls. In other embodiments, the fixed rail 141 and/or the adjustable rail 143 have only one wall. Where the adjustable rail 143 has only one wall, the adjustable rail 143 may be branched at the end to accommodate the roller wheel 150, or alternatively, the adjustable rail 143 may have a smooth surface to redirect the connection line 5.

In some embodiments, the end wall 141B of the fixed rail 141 is coupled to the front wall 134 of the frame 130. In some embodiments, the end wall 141B is affixed to the front wall 134 by bolts, welding, brazing, or attachment technique of sufficient structural strength.

Figure 16:
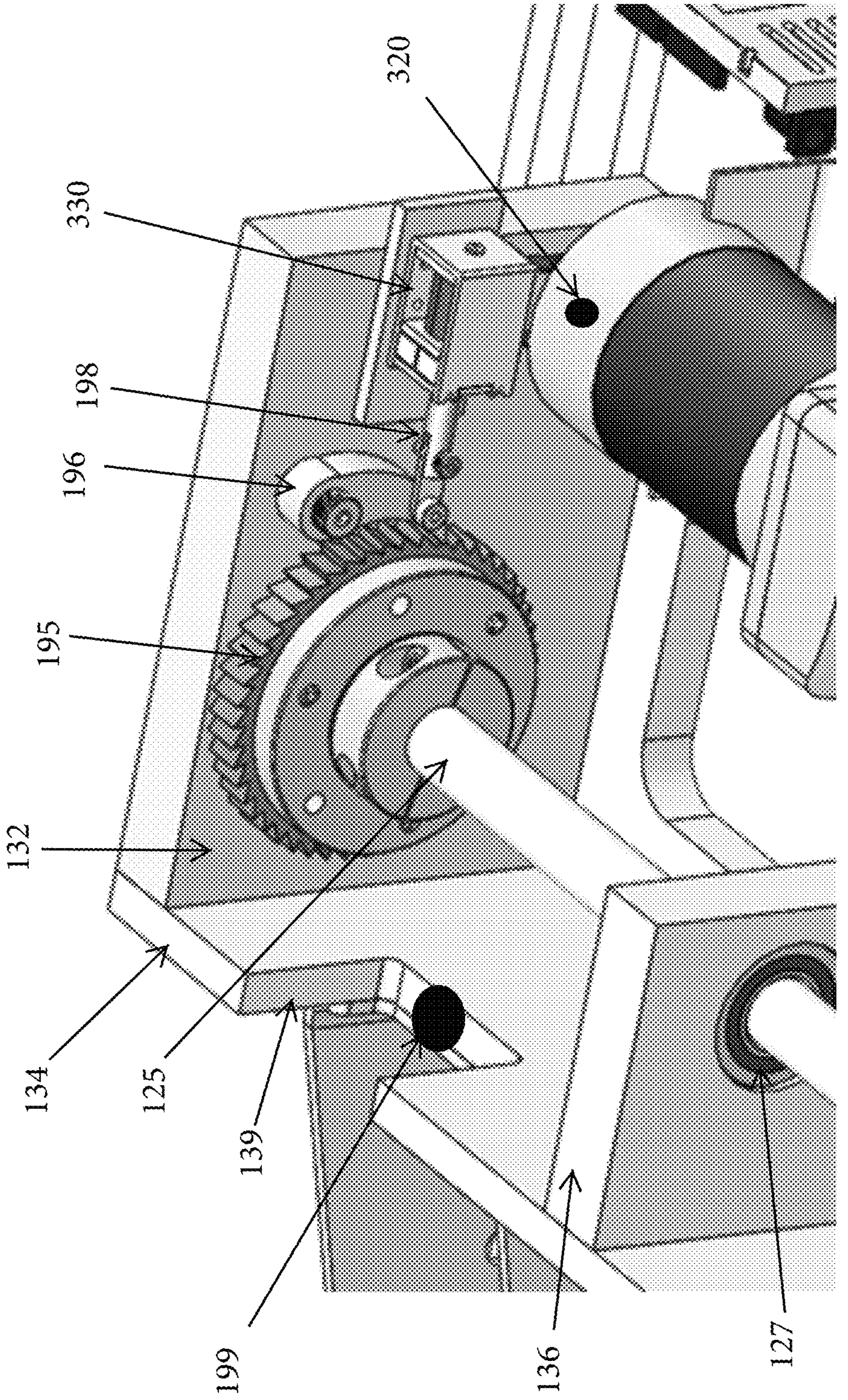
FIG. 16 shows a detailed internal view of the posture assistance device of FIG. 1

FIG. 16 shows a ratchet and pawl mechanism in the device 100. A ratchet wheel 195 is fixedly attached to the belt shaft 125. A pawl 196 selectively engages with the ratchet wheel 195. An actuator 330 receives commands from the controller 362 to selectively actuate the pawl 196 with an actuator rod 198. When the pawl 196 is engaged with the ratchet wheel 195, the belt shaft 125 may be maintained in a stationary position to resist torque applied to the belt shaft 125. This may occur, for example, when the connection line 5 is supporting the weight of the user, causing the connection line 5 to apply a torque to the belt shaft 125. The pawl 196 may also be engaged with the ratchet wheel 195 when the connection line 5 is being shorted and the belt shaft 125 is moving in a clockwise direction. In one embodiment, the actuator 330 is a latching solenoid. One or more motor Hall sensors 320 are configured to measure a position and speed of the motor 110, according to some embodiments.

The front wall 134 has two slots 139 through which the connection line 5 passes, one of which is shown in FIG. 16. FIG. 16 shows a U-shaped slot 139, but other forms and shapes of channels, openings, and/or grooves may be employed. In one embodiment, a proximity sensor 199 is attached in one or more slots 139. However, the proximity sensor 199 may also be disposed in any other location close enough to the fed out portion of the connection line such that the proximity sensor 199 can detect proximity of the magnet 6 on the connection line 5.

Figure 17:
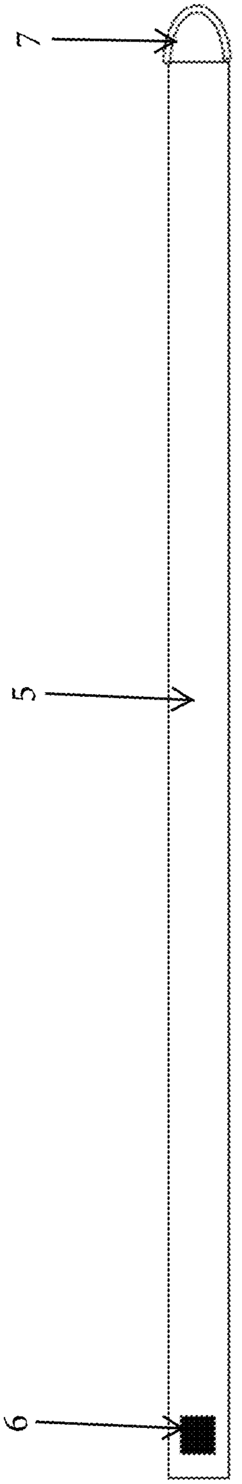
FIG. 17 shows a connection line of the posture assistance device of FIG. 1, according to one embodiment.

FIG. 17 shows a schematic view of a connection line 5 according to one embodiment of the present disclosure. The connection line 5 may be one continuous belt. The magnet 6 is coupled to the connection line 5. For example, in some embodiments the magnet 6 is sewn into the connection line 5 or inserted into a pocket in the connection line 5. The magnet 6 is at a location such that the proximity sensor 199 senses proximity of the magnet 6 when the connection line 5 is in the upright position, in which the user is sitting upright. An attachment mechanism 7 is attached at one end of the connection line 5.

In some embodiments, the attachment mechanism 7 is a D-ring that is attached to the connection line 5 and is configured to couple to a harness or item of clothing worn by the user. In other embodiments, the attachment mechanism may be a circular ring, a loop, or a buckle. In one embodiment the attachment mechanism is a breakaway buckle configured to fail above a predetermined force. In some embodiments the connection line 5 is a belt. In other embodiments the connection line is a cable, rope, cord, or strap.

FIG. 18 shows a top view of a connection line 5A, 5B according to another embodiment of the present invention. The connection line 5A, 5B includes a first belt segment 5A and a second belt segment 5B. The first belt segment 5A is configured to be attached to the second belt segment 5B with hook and loop fasters 9A, 9B. The first portion of the hook and loop fasteners 9A is attached to the first belt segment 5A and the second portion of hook and loop fasters 9B is attached to the second belt segment 5B. The first portion of the hook and loop fasteners 9A may be hooks, and the second portion of the hook and loop fasteners 9B may be loops. Alternatively, the first portion of the hook and loop fasteners 9A may be loops, and the second portion of the hook and loop fasteners 9B may be hooks. The hook and loop fasters 9A, 9B are attached to the respective belt segments 5A, 5B. In one embodiment, the hook and loop fasteners 9A, 9B may be sewn onto the respective belt segments 5A 5B. In other embodiments the hook and loop fasters 9A, 9B are attached to the belt segments 5A, 5B by other techniques such as gluing or stapling.

The hook and loop fasteners 9A, 9B maintain the tension in the connection line 5A, 5B below a desired threshold. If the tension in the connection line 5A, 5B, exceeds a threshold, the hook and loop fasteners 9A, 9B separate, thus separating the first belt segment 5A from the second belt segment 5B.

A magnet 6 is coupled to the first belt segment 5A. In one embodiment, the magnet 6 is sewn into the first belt segment 5A or inserted into a pocket in the first belt segment 5A. The magnet 6 is at a location such that the proximity sensor 199 senses proximity of the magnet 6 when the connection line 5A, 5B is in an "Upright position" in which the user is sitting in an upright position. An attachment mechanism 7 is attached at one end of the connection line 5A, 5B.

In some embodiments, the attachment mechanism 7 is a D-ring that is attached to the connection line 5 and is configured to couple to a harness or item of clothing worn by the user. In other embodiments, the attachment mechanism may be a circular ring, a loop, or a buckle. In some embodiments the attachment mechanism is a breakaway buckle configured to fail above a predetermined force.

Figure 19:
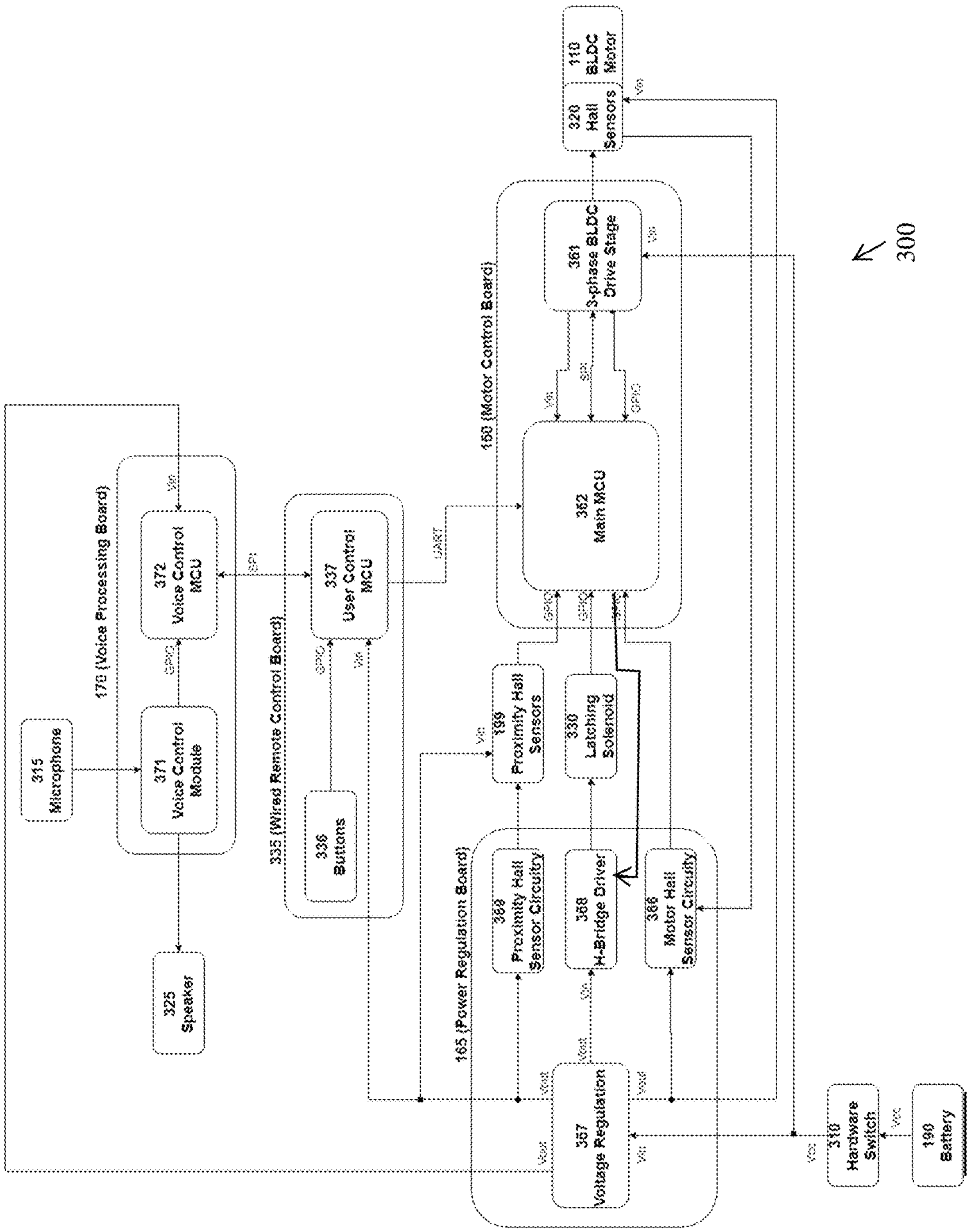
FIG. 19 shows the electrical system of the posture assistance device of FIG. 1.

FIG. 19 shows a layout of an electrical system 300 for device 100 according to some embodiments. The device is powered by the battery 190. In one embodiment, the battery 190 is a 24-volt (V) battery. A hardware switch 310 selectively connects or disconnects the battery 190 from the rest of the system 300. The hardware switch 310 may be a switch, for example a mechanical switch or electrical button, that allows a user to shut off the battery 90 when the device 100 is not in use.

Voltage from the battery 190 is directly supplied to the 3-phase Brushless DC motor (BLDC) drive stage 361. The voltage regulator 367 on the power regulation board 165 supplies power to other components at their respective operating voltages. The voltage regulator 367 provides a voltage, for example 9V, to the voice control micro-controller unit (MCU) 372. The voltage regulator 367 also provides a voltage, for example 24 volts, to the H-Bridge driver 368, which drives the actuator 330. The voltage regulator 367 also provides a voltage, for example 5V, to the proximity sensors 199 and the proximity sensor circuitry 369. The voltage regulator also provides a voltage, for example 5V, to the motor hall sensors 320 and the motor hall sensor circuitry 366. In one embodiment, the voltage regulator 367, the proximity hall sensor circuitry 369, the H-bridge driver 368, and the motor hall sensor circuitry 366 are all located on the power regulation board 165.

In some embodiments the electronic system 300 include both a voice processing board 170 and a wired remote control board 335. In another embodiment, the voice processing board 170 and the wired remote control board 335 are integrated on single board. In another embodiment, system 300 employs a voice control processing board 170 but not a remote control board 335. In yet another embodiment, system 300 employs a remote control board 335 but not a voice control processing board 170.

A user control MCU 337 may be utilized to receive signals from the voice control MCU 372 and from the buttons 336 and convert them to a uniform signal to send to the main MCU 362. In one embodiment, a micro controller such as the Arduino Pro Mini may be used as the user control MCU 362. User control MCU 337 may be located in the wired remote control board 335 that is wired to the main MCU 362.

Figure 20:
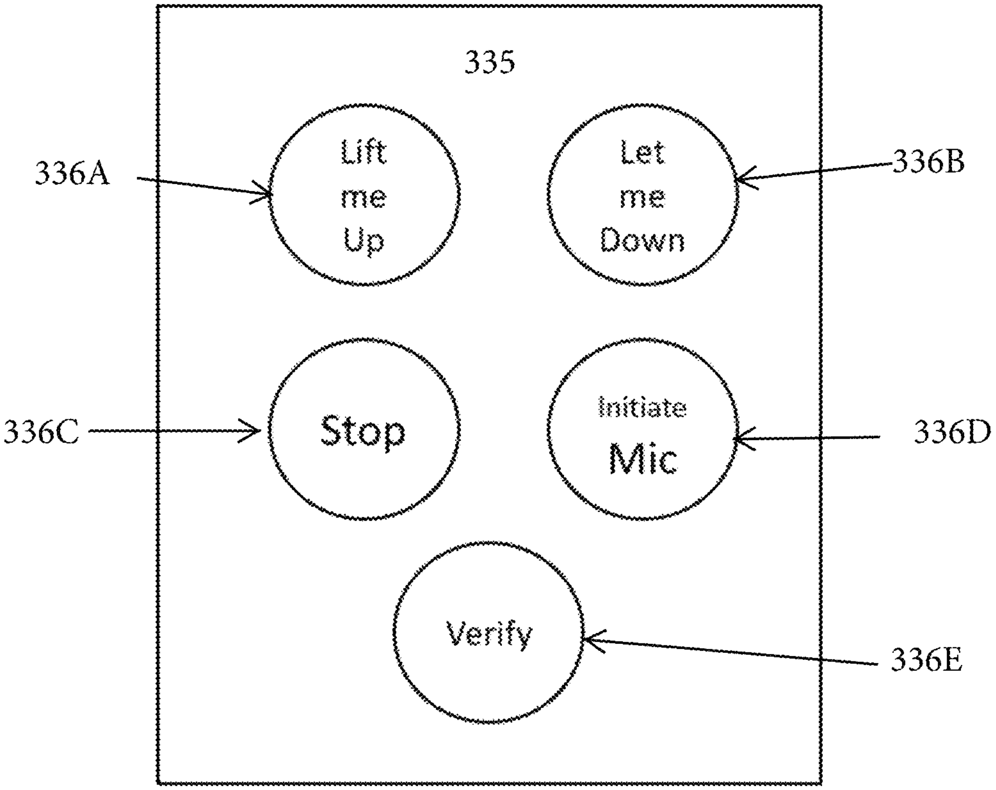
FIG. 20 shows the remote control board of the posture assistance device of FIG. 1

In one embodiment, as shown in FIG. 20, the remote control board 335 may include a plurality of buttons 336. These buttons 336 may include a button 336A that the user may use to implement a raising command telling the system to shorten the connection line 5 to lift the user up. Another button 336B may be used to implement a lowering command telling the system to lengthen the connection line 5 in order to let the user down. Another button 336C may be used to implement a stop command telling the system to stop lengthening or shortening the connection line 5. Another button 336D may be used to initiate the microphone 315 to receive voice control commands. Another button 336E may be used to verify that a voice control command was received and parsed by the User Control MCU 337. The User Control MCU 337, shown in FIG. 19, sends the user commands from the buttons 336 to the Main MCU 362. In some embodiments, the buttons 336 are mechanical switches.

The voice control module 371 receives a signal from a microphone 315 which receives a voice input from the user. In one embodiment, the voice control module 371 is implemented using a multi-purpose speech recognition module such as the Fortebit EasyVR 3 Plus. The voice control module 371 connects to the Voice Control MCU 372, which is an Arduino Uno in some embodiments. The Voice Control MCU 372 is wired to the User Control MCU 337 located in the wired remote control board 337.

The voice control MCU 372 may be configured to receive a voice command indicating that the user desires to be lifted up (a raising command, such as "Lift me up"), a voice command indicating that the user desires to be let down (a lowering command, such as "Let me down"), and a voice command indicating that the user desires for the connection line 5 to be locked in place (a stop command such as "Stop"). In some embodiments, the voice control MCU 372 is also configured to receive an initiation command (such as "Initiate") indicating that a user desires to give a raising command or a lowering command. A speaker 325 is used to send audible feedback to the user to verify whether or not a voice command was recognized by the Voice Control MCU 372.

Figure 21:
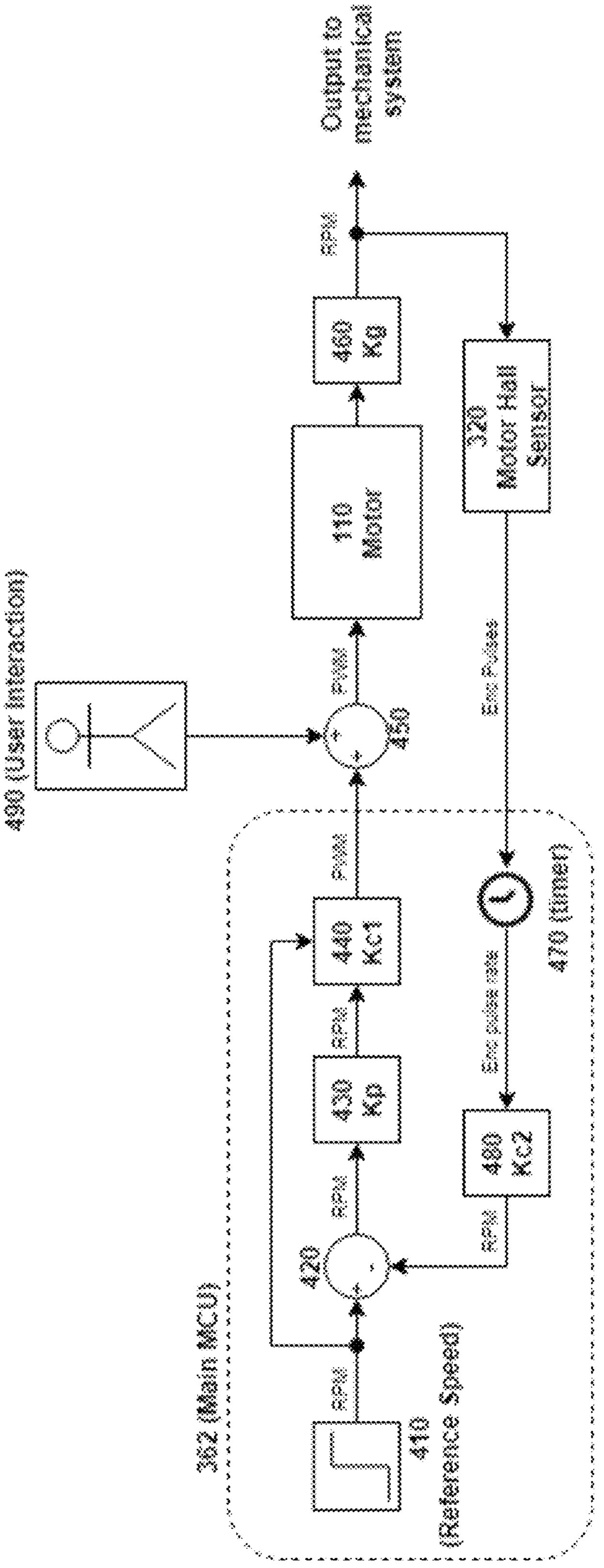
FIG. 21 shows a control scheme for the posture assistance device of FIG. 1.

FIG. 21 shows a speed control system 400 that may be used, for example, by device 100. In one embodiment, speed control system 400 is implemented on the Main MCU 362. FIG. 21 demonstrates the closed-loop design of the system, with the interaction of the user 490 to the system evaluated as a disturbance (at 450) to the Pulse Width Modulated (PWM) output to the motor (from 440). The closed loop system increases or decreases the output to the motor (from 440) to maintain constant speed (reference speed 410). The Main MCU 362 generates the reference speed 410 for the system, and the controller includes a gain, Kp 430. Both the reference speed 410 and the value of the gain Kp 430 can be adjusted in the software to meet the user's desired operation and/or comfort.

At block Kc1 440 the PWM commands used to control the motor (from 440) are calculated, based on the RPM comparison at 420. This calculation centers the control output around the reference speed 410 and sets output boundaries to select a PWM setpoint output that does not exceed minimum and maximum PWM values, for example minimum and maximum physically achievable PWM values, according to some embodiments of the present disclosure. The gain Kg 460 represents the adjustment accounting for the gear ratio of the motor 110.

The output speed of the motor is read by the motor Hall sensors 320 that are acting as encoders, according to some embodiments. This data is fed back into the Main MCU 362, where encoder pulses are continually counted within a set time window (for example, 100 microseconds) to convert the encoder pulses into a measured speed. Kc2 480 represents the conversion from encoder pulses to the measured motor speed in RPM. This measured speed from Kc2 480 is compared (at 420) with the reference speed 410, and the PWM control signal from the Main MCU 362 to the motor 110 is adjusted at 440 based on the comparison 420 to maintain a constant speed.

The speed control system allows the system to automatically adjust the torque supplied to the user depending on the current ability of the user to move their body in the chair by themselves, according to some embodiments. For users with less ability to move themselves, the system adjusts to supply more torque to move the user's weight. By using a control system to set the motor to run at a slow and constant speed, the torque that the motor 110 provides will automatically adjust based on the weight and strength of the user, according to some embodiments.

Figure 22:
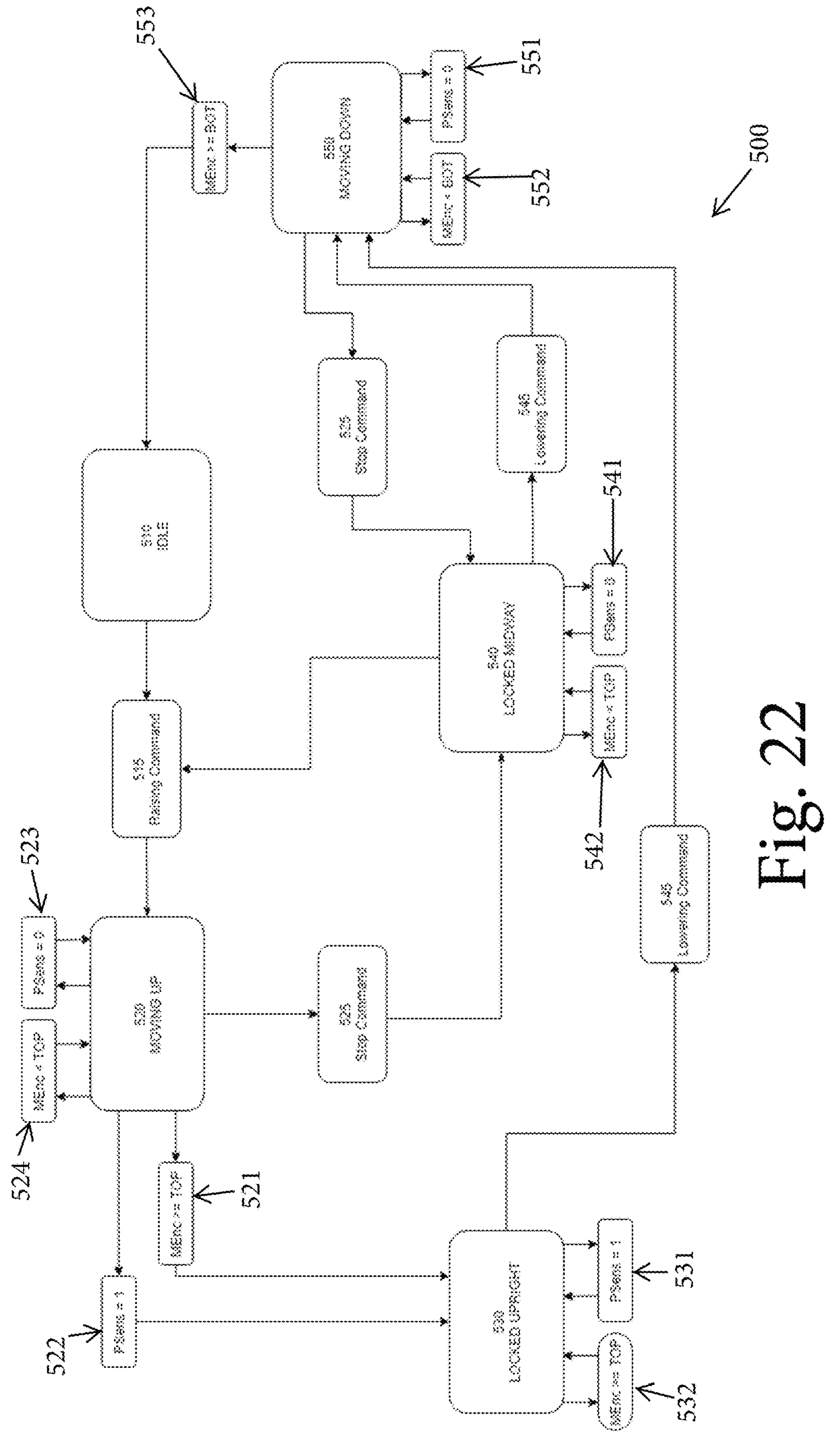
FIG. 22 shows the state machine for the posture assistance device of FIG. 1.

A software state machine 500 for the device 100 is shown in FIG. 22, and is implemented in the Main MCU 362 according to some embodiments. The state machine keeps track of the encoder count of the motor 110, for example when device 100 is on, in order to keep an accurate record of the user's position. There are two checks to determine when the user has reached the upright position, according to some embodiments. When the encoder count, MEnc, is greater than or equal to TOP (at 521) or when the proximity hall sensor 199 is activated, i.e. PSens=1 (at 522), the user has reached a desired upright position and the state may be changed to LOCKED UPRIGHT 530. Examples of each of the states shown in FIG. 22 are discussed below.

The state machine 500 is in the LOCKED UPRIGHT 530 state when the user is in the upright position, according to some embodiments. The system enters this state when the motor encoder count is greater than or equal to TOP 521 or the proximity sensor 199 is activated 522. The motor 110 is turned off in this state, and the actuator 330 is in a DOWN position such that the pawl 196 is engaged with the ratchet wheel 134, thus locking the connection line 5 in place and supporting the user.

When the state machine 500 is in the IDLE state 510, the motor 110 is off and the user is free to move without being locked in the upright position. The system enters the IDLE state 510 when the connection line 5 is fed out from the motor shaft 116 until the encoder count reaches the value "BOT" 553, indicating that the connection line 5 is in the lowered position. The difference between BOT and TOP is the distance, in encoder counts, between the most downward position of the user and the upright position of the user. The system only transitions out of the IDLE state 510 upon receipt of a raising command 515 from the user. Commands may be received through the microphone 315 and/or the buttons 336, among other possible command inputs. Upon receipt of the raising command 515, the system may enter the MOVING UP STATE 520. In the IDLE state 510, the actuator 330 is in an UP position such that the pawl 196 is not engaged with the ratchet wheel 195, according to some embodiments.

When the state machine 500 is in the MOVING UP state 520, the motor wraps the connection line 5 around the belt shaft 125 to short the fed-out portion of the connection line 5, thus pulling the user up. In one example the motor turns in a clockwise direction when the system is in the MOVING UP STATE 520. In other embodiments the motor turns in a counter-clockwise direction when the system is in the MOVING UP STATE 520. If a STOP command 525 is received from the user, the system will transition to the LOCKED MIDWAY state 540, according to some embodiments. If the motor reaches the max encoder number, i.e. MEnc=TOP, 521, or if the proximity sensor is activated, i.e. PSens=1, 522 the system will transition to the LOCKED UPRIGHT state 530 in some embodiments. In the MOVING UP state 520, the actuator 330 is in a DOWN position such that the pawl 196 is engaged with the ratchet wheel 195 in some embodiments. In other embodiments, the actuator 330 is in an UP position in the MOVING UP state such that the pawl 196 is disengaged with the ratchet wheel 195.

When the state machine 500 is in the MOVING DOWN state 550, the device 100 is increasing a length of the fed-out portion of the connection line 5 to let the user down. In one example, the motor 110 is turning counter-clockwise direction in the MOVING DOWN state to lengthen a fed-out portion of the connection line 5. In other embodiments, the motor 110 is turning clockwise in the MOVING DOWN state to lengthen a fed-out portion of the connection line 5. The system will enter the MOVING DOWN state 550 from the LOCKED UPRIGHT state 530 or the LOCKED MIDWAY state 540 upon receiving a lowering command 545 from the user, according to some embodiments. In the MOVING DOWN state 550, the actuator 330 is in an UP position such that the pawl 196 is not engaged with the ratchet wheel 195, according to some embodiments.

The state machine 500 enters the LOCKED MIDWAY state 540 from either the MOVING DOWN state 540 or the MOVING UP state 520 when a STOP command 525 is received, according to some embodiments. The system can leave this state in response to a raising command 515; the system can also leave this state in response to a lowering command 545. The motor 110 is turned off in this state. In the LOCKED MIDWAY state 540, the actuator 330 is in a DOWN position such that the pawl 196 is engaged with the ratchet wheel 195, according to some embodiments.

The operation of the device according to some embodiments is described here. The user 3 may begin in a down position, as shown in FIG. 2A. In this position, the state machine 500 is in the IDLE state 510. If the user desires for the device 100 to assist the user 3 in sitting up, the user 3 presses the "Lift me Up" button 336A on the wired remote control board 335. Alternatively, the user may press the "Initiate Mic" button 336D on the wired remote control board 335 or say "Initiate", both of which indicate a desire to give a voice command. The initiation command is then processed by the user control MCU 337 and the voice control MCU 372, and the speaker 325 outputs an audible verification that the initiation command was received and processed. The user may then give a voice command indicating a desire to be lifted up, such as "Lift me up." The voice command is received by the microphone 315 and processed by the voice control module 371 and the voice control MCU 372 and sent to the user control MCU 337. The speaker 325 outputs an audible verification indicating that the "lift me up" command was received and processed.

The user control MCU 337 then sends a signal to the Main MCU 362 indicating that the "lift me up" command was received. The state machine 500 switches to the "MOVING UP" state 520. The user control MCU 337 sends a drive signal to the drive stage 361 of the motor 110 to rotate the motor 110 in a counter-clockwise direction. The user control module 337 also sends a signal to the H-bridge driver 368 to move the actuator 330 to the "down" position such that the pawl 196 is engaged with the ratchet wheel 195. The Main MCU 362 continually monitors the speed of the motor using the signal from the motor Hall sensors 320. The Main MCU adjusts the control signal to the drive stage 361 based on the measured speed, in accordance with the control scheme shown and described in relation to FIG. 21.

As the motor 110 turns counter-clockwise, the motor shaft 116 drives the belt shaft 125 in a counter-clockwise direction via the timing belt 120. The connection lines 5 wrap around the belt shaft 125 as it rotates in a counter-clockwise direction. This, in turn, shortens a length of the fed-out portion of the connection lines 5, causing the connection lines to slide over the roller wheels 150 toward the device 100. The torso of the user 3, which is connected to the connection lines 5 via attachment mechanisms 7, is thus pulled up and back toward the upright position.

If the user desires to stop being raised before reaching the upright position the user may press the "Stop" button 336C or give the audible voice command "Stop." The command is processed and received by the Main MCU 362, and the state machine enters the LOCKED MIDWAY state 540. The Main MCU 363 sends a command to turn the motor 110 off, and the actuator 330 remains in the down position. The ratchet wheel 195 and pawl 196 counteract the weight of the patient on the connection line 5 by maintaining the belt shaft 125 in a static position.

If the user does not give a "Stop" command, the connection line 5 will continue to lift the user until the upright position is reached. The upright position is reached when the magnet 6 on the connection line 5 passes close to the proximity sensor 199. The proximity sensor 199 then sends a "1" to the main MCU 362, which enters the LOCKED UPRIGHT state 530 in response. The Main MCU 362 may also detect the upright position by keeping track of the encoder count from the motor Hall sensor 320. The Main MCU 363 sends a command to turn the motor 110 off, and the actuator 330 remains in the down position. The ratchet wheel 195 and pawl 196 counteract the weight of the patient on the connection line 5 by maintaining the belt shaft 125 in a static position.

If the user in the upright position or midway position desires to be let down, he or she may press the "Let me down" button 336B on the wired remote control 335 or give the audible command "Let me down." The command is received and processed, and the state machine 500 enters the MOVING DOWN state. The main MCU 362 sends a signal to the H-bridge driver 368 to move the actuator to the up position, such that the pawl 196 is disengaged with the ratchet wheel 195. The motor 110 drives the belt shaft 125 in a clockwise direction. The state machine remains in the MOVING DOWN state 550 until receiving a stop command (in which case the state machine 500 enters the LOCKED MIDWAY state 540), or until the encoder count from the motor hall sensor 320 indicates that the device is in the lowered position (in which case the state machine 500 enters the IDLE state 510).

Figure 23:
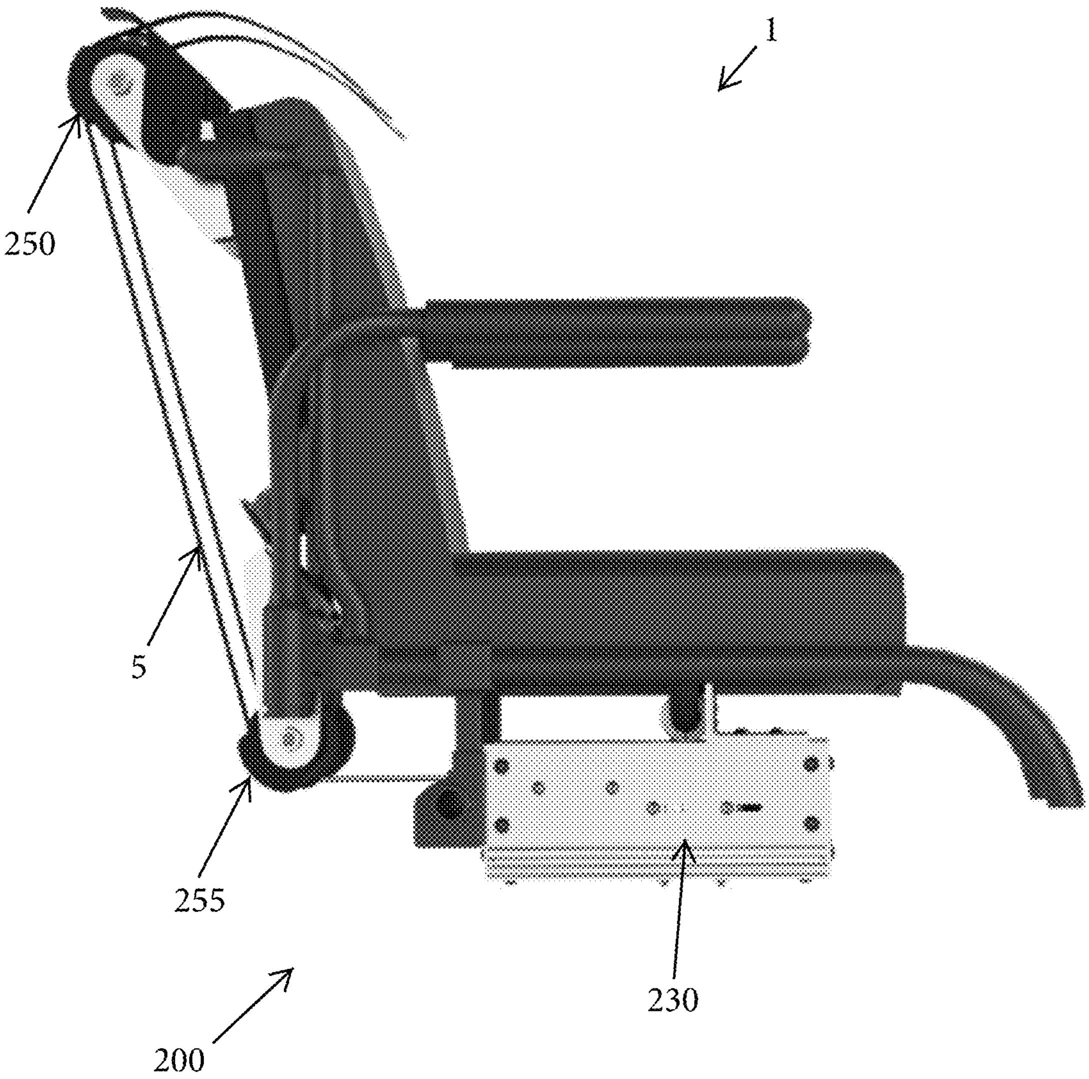
FIGS. 23-25 show a posture assistance device according to one embodiment.
Figure 24:
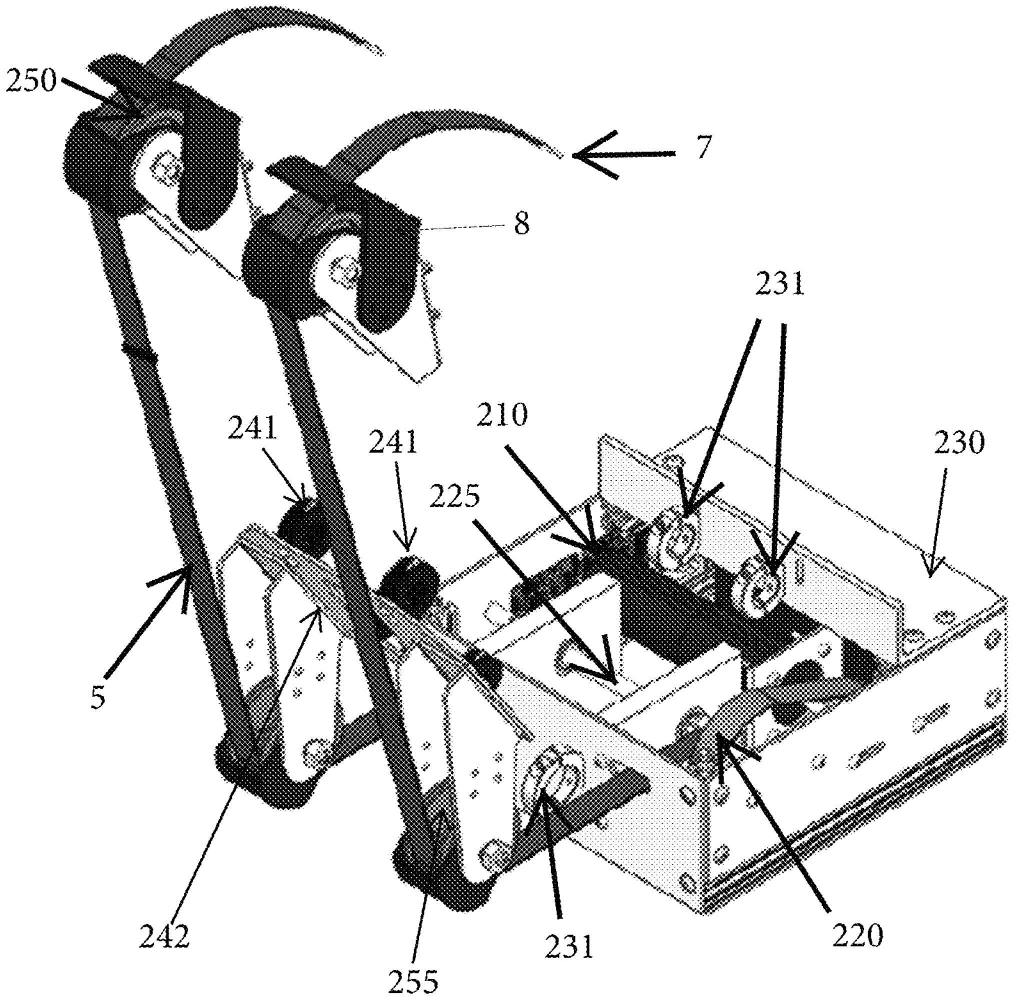
Figure 25:
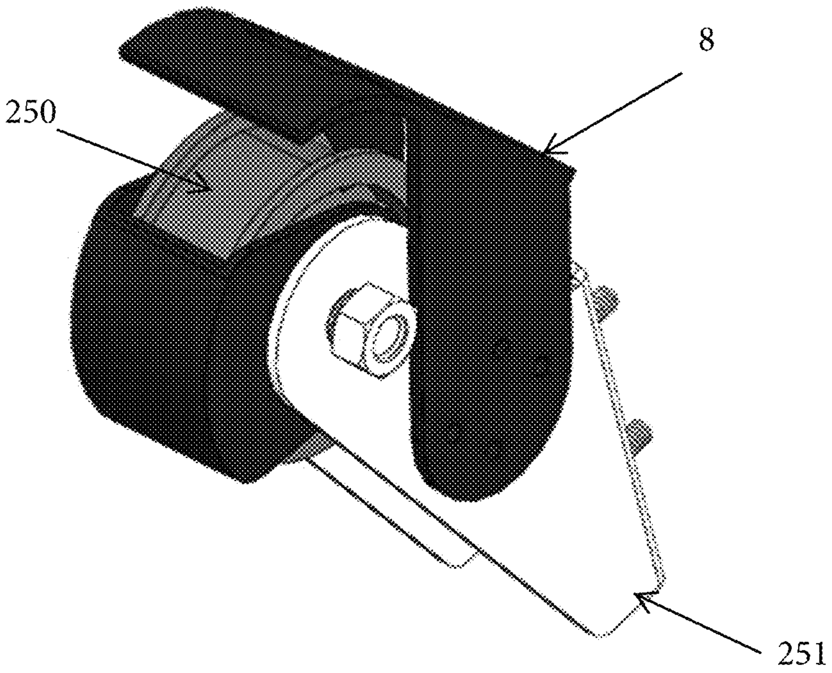

FIGS. 23-25 show a device 200 according to an alternative embodiment. Certain components described here may operate similar to those described above for FIGS. 1, 2A, 2B, and 8-16. In this embodiment, the roller wheels 250, 255 and the motor box 230 are separately attached to the chair 1. The motor box 230 is attached to the chair with a first set of shaft collars 231. The lower roller wheels 255 are attached to the chair with a lower frame 242 and a second set of shaft collars 241. The upper roller wheels 250 are attached to the chair with upper frames 251, which may be directly attached to the chair 1, for example with bolts. In some cases, a hair shield 8 is attached to upper frame 251 to discourage the user's hair from being caught in the roller wheel 151. Connection line 5 may pass through a slot in the hair shield 8, according to some embodiments.

In some embodiments, device 200 operates in substantially the same manner as device 100 discussed above. The motor 210 rotates a belt shaft 225 via a timing belt 220. In other embodiments, the belt shaft 225 may be rotated directly by the motor 210. The connection line 5 is coupled to the belt shaft 225 such that rotation of the belt shaft may lengthen or shorten a length of the fed-out portion of the connection line 5 depending on the direction of rotation of the motor 210 and the belt shaft 225. The device 200 further includes a ratchet and pawl mechanism coupled the belt shaft 225; the ratchet and pawl mechanism being substantially the same as the ratchet and pawl mechanism shown and described in relation to FIG. 10.

Further, device 200 may use the electrical system as shown and described in relation to FIG. 19, and use the same boards and sensors. The remote control board 335 shown in FIG. 20 may be used with device 200. Furthermore, the device 200 may utilize the control scheme 400 shown and described in relation to FIG. 21 and the state machine 400 shown and described in relation to FIG. 22. In some embodiments, the device 200 includes the continuous connection line 5 arrangement shown and described in relation to FIG. 17. In other embodiments, the device 200 includes the split connection line 5A, 5B arrangement shown and described in relation to FIG. 18.

A posture assistance device 100 according to some embodiments includes a motor 110 coupled to a frame 130, wherein the frame 130 is configured to be attached to a wheelchair 1; a shaft 125 coupled to the motor 110, wherein the motor 110 is configured to rotate the shaft 125; an extension arm 140 attached to the frame 130, the extension arm 140 including a redirection surface 150A, wherein the extension arm 140 is selectively adjustable to change a distance between the redirection surface 150A and the shaft 125; and the extension arm 140 further including a connection line 5 coupled to the shaft 125 and configured to engage with the redirection surface 150A, such that rotation of the shaft 125 changes a length a fed-out portion of the connection line 5; and an attachment mechanism 7 configured to couple the connection line 5 to a user 3.

A posture assistance device 100 according to some embodiments includes a motor 110 coupled to a frame 130, wherein the frame 130 is configured to be attached to a wheelchair 1; a shaft 125 coupled to the motor 110, wherein the motor 110 is configured to rotate the shaft 125; an extension arm 140 attached to the frame 130, the extension arm 140 including a redirection surface 150A, wherein the extension arm 140 is selectively adjustable to change a distance between the redirection surface 150A and the shaft 125; and the extension arm 140 further including a connection line 5 coupled to the shaft 125 and configured to engage with the redirection surface 150A, such that rotation of the shaft 125 changes a length a fed-out portion of the connection line 5; and an attachment mechanism 7 configured to couple the connection line 5 to a user 3; and a controller 362, wherein the controller is configured to receive a motor speed signal (from 320) representing a speed of the motor 110; and the controller 362 is configured to operate in a lifting mode 520, wherein in the lifting mode 520, the controller 362 is configured to send a drive signal to the motor 110, the drive signal being based on a comparison (at 420) between the speed of the motor (from 320) and a reference speed 410.

What is claimed is:

1. A mobility assistance device, comprising:

a connection line configured to be coupled to a user;

a motor configured to extend and retract the connection line to adjust a posture of the user; and a controller, wherein the controller is configured to:

receive a motor speed signal representing a speed of the motor; and operate in a lifting mode to send a drive signal to the motor, the drive signal being based on a comparison between the speed of the motor and a reference speed; and adjust the drive signal to automatically adjust torque based on a weight and strength of the user to maintain the speed of the motor at a constant speed during the lifting mode.

2. The mobility assistance device of claim 1, wherein the drive signal comprises a pulse width modulated (PWM) signal, the PWM signal being calculated based on the comparison between the speed of the motor and the reference speed.

3. The mobility assistance device of claim 2, wherein the controller further comprises a maximum PWM value, wherein the PWM signal is further calculated to not exceed the maximum PWM value.

4. The mobility assistance device of claim 1, wherein:

the motor comprises a motor Hall sensor configured to send an encoder count to the controller;

the controller is further configured to calculate the speed of the motor based on the encoder count; and the controller is further configured to determine a position of the user based on the encoder count.

5. The mobility assistance device of claim 4, wherein:

the controller is further configured to determine that the user is in an upright position based on the encoder count; and the controller is further configured to send a signal to an actuator to lock the connection line in place when the user is in the upright position.

6. The mobility assistance device of claim 5, further comprising a magnet coupled to the connection line and a proximity sensor, wherein the controller is further configured to determine that the user is in the upright position based on a signal from the proximity sensor indicating that the magnet is close to the proximity sensor.

7. The mobility assistance device of claim 6, wherein the actuator is configured to selectively engage a ratchet and pawl mechanism coupled to the connection line.

8. The mobility assistance device of claim 1, wherein the controller is further configured to receive a plurality of user commands, the plurality of user commands comprising an indication to operate in the lifting mode, an indication to operate in a lowering mode, and an indication to stop rotation of the motor.

9. The mobility assistance device of claim 1, further comprising an extension arm having an adjustable length to change an angle at which the connection line is coupled to the user.

10. A mobility assistance method comprising:

receiving, at a controller, a motor signal representing a speed of a motor, wherein the motor is configured to extend and retract a connection line, the connection line being configured to be coupled to a user;

operating the controller in a lifting mode;

sending, in the lifting mode, a drive signal from the controller to the motor, the drive signal being based on a comparison between the speed of the motor and a reference speed; and adjusting, by the controller, the drive signal to automatically adjust torque based on a weight and strength of the user to maintain the speed of the motor at a constant speed during the lifting mode.

11. The mobility assistance method of claim 10, wherein adjusting the drive signal comprises adjusting a pulse width modulated (PWM) signal, the method further comprising calculating, at the controller, the PWM signal based on the comparison between the speed of the motor and the reference speed.

12. The mobility assistance method of claim 11, wherein the PWM signal is further calculated to not exceed a maximum PWM value.

13. The mobility assistance method of claim 10, further comprising:

calculating, by the controller, the speed of the motor based on an encoder count, wherein the encoder count is received from a motor Hall sensor on the motor; and determining, by the controller, a position of the user based on the encoder count.

14. The mobility assistance method of claim 13, further comprising:

determining, at the controller, that the user is in an upright position based on the encoder count; and sending, by the controller, a signal to an actuator to lock the connection line in place when the user is in the upright position.

15. The mobility assistance method of claim 13, further comprising determining, at the controller, that the user is in an upright position based on a signal from a proximity sensor indicating that a magnet is close to the proximity sensor, the magnet being coupled to the connection line; and sending, from the controller, a signal to an actuator to lock the connection line in place when the user is in the upright position.

16. The mobility assistance method of claim 15, further comprising selectively engaging, with the actuator, a ratchet and pawl mechanism coupled to the connection line.

17. The mobility assistance method of claim 10, further comprising receiving, at the controller, a plurality of user commands, the plurality of user commands comprising an indication to operate in the lifting mode, an indication to operate in a lowering mode, and an indication to stop rotation of the motor.

* * * * *